(12) United States Patent
Yamaki

(10) Patent No.: US 6,873,373 B2
(45) Date of Patent: Mar. 29, 2005

(54) IMAGE EMPHASIZING APPARATUS AND IMAGE EMPHASIZING PROGRAM

(75) Inventor: Kenichiro Yamaki, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 545 days.

(21) Appl. No.: 10/102,794

(22) Filed: Mar. 21, 2002

(65) Prior Publication Data

US 2002/0135702 A1 Sep. 26, 2002

(30) Foreign Application Priority Data

Mar. 23, 2001 (JP) ........................................ 2001-083948

(51) Int. Cl.$^7$ .............................................. H04N 5/21
(52) U.S. Cl. ..................................... 348/625; 348/630
(58) Field of Search ................................ 348/625, 630, 348/607, 624, 26, 252, 606; 382/266, 254; H04N 5/21

(56) References Cited

U.S. PATENT DOCUMENTS 6,233,022 B1 * 5/2001 Weston et al. .............. 348/625
6,278,494 B1 * 8/2001 Kanai et al. ................ 348/625

FOREIGN PATENT DOCUMENTS

JP 06-062278 3/1994
JP 2000-244775 9/2000

* cited by examiner

Primary Examiner—Sherrie Hsia
(74) Attorney, Agent, or Firm—David G. Conlin; Edwards & Angell

(57) ABSTRACT

An image emphasizing apparatus includes: an outline component extraction section; a threshold value calculation section for calculating first and second threshold values; and an outline correction section for generating an outline emphasizing signal from the outline component based on the first and second threshold values, and adding the outline emphasizing signal to the input video signal, thereby generating an output video signal, wherein the outline correction section includes: an emphasizing signal generation section for generating the outline emphasizing signal, which is generated while limiting an absolute value of the outline component so as to be equal to or smaller than the first threshold value when the absolute value of the outline component is equal to or smaller than the second threshold value; and a signal addition section for adding the outline compensation signal generated based on the outline emphasizing signal to the input video signal.

13 Claims, 18 Drawing Sheets

FIG.3

| Ssel | Source of input | C1 | C2 | C3 | C4 | C5 | C6 | C7 |
|---|---|---|---|---|---|---|---|---|
| H | HDTV | 0 | −1 | −1 | 4 | −1 | −1 | 0 |
| L | NTSC | −1 | −2 | −1 | 8 | −1 | −2 | −1 |

FIG.8

| Control input | | | | Output |
|---|---|---|---|---|
| Se | Sf | Sg | Sh | Ss |
| H | X | X | X | Sj |
| L | H | X | X | α |
| X | L | L | X | Sa |
| X | X | H | L | −α |
| X | X | X | H | Sj |

FIG.9

| Sc | So |
|---|---|
| H | Sm |
| L | Si |

— △ — Thin line with excessive emphasis correction
— ▲ — Normal width line with excessive emphasis correction
— ✱ — Thin line original image
— ✕ — Normal width line original image
- - ○ - - Thin line without excessive emphasis correction
- - ● - - Normal width line without excessive emphasis correction

IMAGE EMPHASIZING APPARATUS AND IMAGE EMPHASIZING PROGRAM

BACKGROUND OF THE INVENTION

1. Field of the Invention

The present invention relates to an image emphasizing apparatus and an image emphasizing program for sharpening an image by emphasizing an outline of the image. Specifically, the present invention relates to an outline compensation circuit which is suitably used in various television receivers, various video apparatuses, such as a video tape recorder (VTR) or the like, and various image display apparatuses, such as liquid crystal displays, plasma displays, or the like.

2. Description of the Related Art

In a conventional television receiver, in order to recover a deterioration of a frequency characteristic of a video signal, which may be caused when an externally-supplied video signal is processed in various circuits before it is output to a display, or in order to improve the visual quality of an image which is reproduced from such a video signal, an outline compensation circuit is provided for performing outline compensation on the video signal. In the outline compensation circuit, a high-frequency component of the video signal (brightness signal) which is to be input to the display is extracted, and the extracted high-frequency component is added to the video signal, whereby rising and falling edges, which correspond to an outline of an image to be displayed, are sharpened. This conventional outline compensation circuit is described with reference to FIG. 17.

FIG. 17 is a circuit diagram showing an exemplary structure of the conventional outline compensation circuit. FIG. 18 shows signal waveforms which illustrate operations of respective sections of the outline compensation circuit shown in FIG. 17. The outline compensation circuit shown in FIG. 17 includes delay elements 87 and 88, adders 89, 90, 91, and 93, and a variable resistor 92 which is referred to as "sharpness volume". Referring to FIGS. 17 and 18, in the outline compensation circuit, the delay element 87 outputs a signal Yb which has been obtained by delaying an externally-supplied video signal Ya. The delay element 88 outputs a signal Yc which has been obtained by delaying the signal Yb output from the delay element 87. The adder 89 outputs a difference signal Yd of the video signal Ya, which is input to the delay element 87, and the signal Yb, which is output from the delay element 87. The adder 90 outputs a difference signal Ye of the video signal Yb, which is input to the delay element 88, and the signal Yc, which is output from the delay element 88. The adder 91 adds the difference signal Yd, which is output from the adder 89, and the difference signal Ye, which is output from the adder 90, so as to output a signal Yf which corresponds to a secondary differentiation of the input video signal Ya. The variable resistor 92 adjusts the gain of the signal Yf output from the adder 91 and outputs the adjusted signal as an outline emphasizing signal Yg. The adder 93 adds the outline emphasizing signal Yg, which is output from the variable resistor 92, and the signal Yb, which is output from the delay element 87, so as to output a video signal Yh which expresses an image having an emphasized outline.

According to the above conventional outline compensation circuit, the video signal Yh, which expresses an image having an emphasized outline in comparison to an image reproduced from the input video signal Ya, is obtained. However, as shown in FIG. 18, in the video signal Yh output from the conventional outline compensation circuit, overshoot or undershoot occurs in a component of the video signal Yh which corresponds to an outline of an image to be displayed. If the overshoot or undershoot is large, the display image is deteriorated. That is, an image expressed by the output video signal Yh results in an unnatural image where the outline has a fringe.

An outline emphasizing apparatus disclosed in Japanese Laid-Open Publication No. 2000-244775 is structured such that the above problem is avoided. In this apparatus, a secondary differentiation signal which corresponds to a secondary differentiation of an input video signal is generated, and the secondary differentiation signal is compared with a predetermined threshold value. If the sign of the secondary differentiation signal is positive and the secondary differentiation signal is equal to or greater than the predetermined threshold value, an outline emphasizing signal is not added to the input video signal. Otherwise, the secondary differentiation signal is added as an outline emphasizing signal to the input video signal.

In the above outline emphasizing apparatus, a secondary differentiation signal is compared with a predetermined threshold value, and when the secondary differentiation signal is equal to or greater than the predetermined threshold value, the secondary differentiation signal is not added as an outline emphasizing signal to an input video signal. Due to such an arrangement, deterioration of the quality of a displayed image which is caused by the above-described overshoot or undershoot can be prevented. However, in such a method where overshoot and undershoot are suppressed by adding only a component of a secondary differentiation signal which is equal to or smaller than a predetermined threshold value, outline emphasization for a finely expressed portion of a displayed image, such as a thin line, a small spot, etc., is restricted. As a result, in the case of displaying an outline-compensated image on a high-definition display, such as a liquid crystal display, a plasma display, or the like, which have high definition, an improvement in the quality of a displayed image which is achieved by the above outline compensation method is small and insufficient.

This problem is described below with respect to FIG. 19.

Herein, assume that an input video signal Si has waveform W11 shown in FIG. 19. An outline component Sa extracted from the input video signal Si by secondary differentiation has a waveform W12 shown in FIG. 19. In the case where outline emphasization is performed by simply adding the outline component Sa to the input video signal Si, an output video signal Sc, which is obtained after the outline emphasization has been performed, has a waveform W13 shown in FIG. 19. In this case, as previously described, overshoot or undershoot which occurs in a signal component of the output video signal Sc, which corresponds to an outline of a displayed image, becomes large. A known method for avoiding such a problem is a method for suppressing overshoot or undershoot, which may occur through an outline emphasization process, based on a predetermined threshold value. Now, based on such a method, assume an example where an excessive emphasis correction threshold value $\alpha$ (>0) is employed, and an outline component Sa is compared with the excessive emphasis correction threshold value $\alpha$ and with a value obtained by inverting the excessive emphasis correction threshold value $\alpha$ (hereinafter, referred to as an "inverted excessive emphasis correction threshold value"). A component of the outline component Sa which exceeds a range of $-\alpha$ to $\alpha$ is not added to the input video signal Si, but only a component within the range of $-\alpha$ to $\alpha$ is added to the input video signal Si. (Hereinafter, such an outline compensation example is simply referred to as a "conventional example".) That is, in this conventional example, the amplitude (in absolute value) of an outline emphasizing signal Ss which is to be added to the input video signal Si is, as shown by a solid line portion of a waveform W14 of FIG. 19, restricted by the excessive emphasis correction threshold value α. The output video signal Sc has a waveform W15 shown in FIG. 19. In this way, according to such a conventional example, outline emphasization is performed only with a component of the outline component Sa within the range of −α to α, whereby overshoot and undershoot can be suppressed, while an inclination of a signal component which corresponds to an outline of an input video signal is increased.

However, in this conventional example, in the case where the input video signal Si has a waveform W16 shown in FIG. 19, the outline emphasizing signal Ss results in a signal represented by a solid line portion of a waveform W17. (Note that in FIG. 19, a dotted line waveform W18 represents an outline component signal.) As a result, the output video signal Sc results in a waveform W19 shown in FIG. 19. The waveform W19 indicates that, in the conventional outline compensation example, for a high-definition image including thin lines, small spots, etc., an improvement in the quality of the displayed high-definition image is insufficient.

SUMMARY OF THE INVENTION

According to one aspect of the present invention, an image emphasizing apparatus for emphasizing an outline of an image expressed by an input video signal by adding an outline compensation signal to the input video signal so as to sharpen the image expressed by the input video signal includes: an outline component extraction section for extracting from the input video signal an outline component which is a signal component corresponding to the outline of the image; a threshold value calculation section for calculating a first threshold value, which is used for suppressing excessive emphasis of the outline, and a second threshold value, which is used for emphasizing an outline of a fine detailed image included in the image, the second threshold value being greater than the first threshold value; and an outline correction section for generating an outline emphasizing signal from the outline component based on the first and second threshold values, and adding the outline emphasizing signal or a gain adjusted outline emphasizing signal, as the outline compensation signal, to the input video signal, thereby generating an output video signal which expresses an image obtained by sharpening the image, wherein the outline correction section includes: an emphasizing signal generation section for generating the outline emphasizing signal, the outline emphasizing signal being generated while limiting an absolute value of the outline component so as to be equal to or smaller than the first threshold value when the absolute value of the outline component is equal to or smaller than the second threshold value, and the outline emphasizing signal being generated without limiting the absolute value of the outline component when the absolute value of the outline component is greater than the second threshold value; and a signal addition section for adding the outline compensation signal generated based on the outline emphasizing signal to the input video signal.

In one embodiment of the present invention, the emphasizing signal generation section outputs the outline component as the outline emphasizing signal when the absolute value of the outline component is smaller than the first threshold value; the emphasizing signal generation section generates as the outline emphasizing signal a signal whose absolute value is equal to the first threshold value when the absolute value of the outline component is greater than the first threshold value and is smaller than the second threshold value; and the emphasizing signal generation section generates a signal by amplifying the outline component as the outline emphasizing signal when the absolute value of the outline component is greater than the second threshold.

In another embodiment of the present invention, the outline component extraction section is formed by a high pass filter whose passing band can be controlled externally.

In still another embodiment of the present invention, the image emphasizing apparatus further includes a signal level detection section for detecting a level of the input video signal, wherein the threshold calculation section calculates the first and second threshold values according to the level detected by the signal level detection section.

In still another embodiment of the present invention, the threshold value calculation section calculates the first threshold value as a value which depends on an externally-supplied first parameter; and the threshold value calculation section calculates the second threshold value as a value which depends on an externally-supplied second parameter.

In still another embodiment of the present invention, the image emphasizing apparatus further includes an outline detection section for detecting an outline portion that is a signal portion of the input video signal which expresses an outline of the image, wherein the outline correction section generates the output video signal by adding the outline compensation signal only to the outline portion of the input video signal.

In still another embodiment of the present invention, the image emphasizing apparatus further includes a signal level detection section for detecting a level of the input video signal, wherein: the threshold calculation section calculates the first and second threshold values according to the level detected by the signal level detection section, and calculates a third threshold value which is used for detecting the outline portion according to the level detected by the signal level detection section; and the outline detection section compares a variation of the input video signal with the third threshold value, and detects a portion of the input video signal in which a variation of the input video signal is greater than the third threshold value as the outline portion.

In still another embodiment of the present invention, the threshold value calculation section calculates the first threshold value as a value which depends on an externally-supplied first parameter; the threshold value calculation section calculates the second threshold value as a value which depends on an externally-supplied second parameter; and the threshold value calculation section calculates the third threshold value as a value which depends on an externally-supplied third parameter.

In still another embodiment of the present invention, the signal level detection section detects as the level of the input video signal, an average value of the input video signal averaged over a predetermined period length of the signal level detection section.

In still another embodiment of the present invention, the outline correction section further includes a multiplication section for multiplying the outline emphasizing signal by an externally-supplied coefficient so as to generate the outline compensation signal.

According to another aspect of the present invention, there is provided an image emphasizing program for emphasizing an outline of original image data by adding an outline compensation component to the original image data so as to sharpen an image expressed by the original image data, the image emphasizing program allowing a computer to perform steps of: extracting from the original image data an outline component which is a component corresponding to an outline of the image; calculating a first threshold value which is used for suppressing excessive emphasis of the outline and a second threshold value which is used for emphasizing an outline of a fine detailed image included in the image, the second threshold value being greater than the first threshold value; generating the outline emphasizing component from the outline component based on the first and second threshold values; and adding the outline emphasizing component or a gain adjusted component of the outline emphasizing component, as the outline compensation component, to the original image data, wherein at the step of generating the outline emphasizing component, the outline emphasizing component is generated while limiting an absolute value of the outline component so as to be equal to or smaller than the first threshold value when the absolute value of the outline component is equal to or smaller than the second threshold value, and the outline emphasizing component is generated without limiting the absolute value of the outline component when the absolute value of the outline component is greater than the second threshold value.

In one embodiment of the present invention, the image emphasizing program further allows the computer to perform a step of sequentially selecting pixels, which form an image expressed by the original image data, as a target pixel, and calculating a value of the target pixel or an average value of a plurality of pixels around the target pixel as an image level, wherein at the step of extracting the outline component, a component which corresponds to an outline at a position of the target pixel is extracted as the outline component; and at the step of calculating the thresholds, the first and second threshold values are calculated as values that are conformable to the image level.

In another embodiment of the present invention, the image emphasizing program further allows the computer to perform a step of sequentially selecting pixels, which form an image expressed by the original image data, as a target pixel, and determining whether or not an outline exists at a position of the target pixel, wherein at the step of extracting the outline component, a component which corresponds to an outline at a position of the target pixel is extracted as the outline component; and at the step of adding the outline compensation component, the outline compensation component is added only to a pixel of an image expressed by the original image data in which it is determined that an outline exists.

According to the present invention, an outline component is extracted from an input video signal, and when the absolute value of the extracted outline component is smaller than a second threshold value, an outline emphasizing signal is generated from the outline component such that the absolute value of the outline emphasizing signal is equal to or smaller than a first threshold value. Thus, unnatural outline emphasis due to undershoot or overshoot can be avoided. Further, when the absolute value of the outline component extracted from the input video signal is greater than the second threshold value, an outline emphasizing signal is generated from the outline component without limiting the absolute value of the outline emphasizing signal. Thus, the quality of a fine detailed image, such as a thin line, a small spot, etc., can be sufficiently improved through an outline emphasization process.

According to the present invention, when the absolute value of the outline component of the input video signal is smaller than the first threshold value, the outline component is output as an outline emphasizing signal. When the absolute value of the outline component is greater than the first threshold value and smaller than the second threshold value, a signal whose absolute value is equal to the first threshold value is generated as an outline emphasizing signal. When the absolute value of the outline component is greater than the second threshold value, a signal having an amplified outline component is generated as an outline emphasizing signal. Based on the thus-generated outline compensation signal, an output video signal is generated. Thus, unnatural outline emphasis due to undershoot or overshoot can be avoided, while the quality of a fine detailed image, such as a thin line, a small spot, etc., can be sufficiently improved through an outline emphasization process.

According to the present invention, an extracted outline component can be changed by changing the passing band of a high pass filter. Thus, an optimum outline emphasization process can be performed according to the frequency characteristic of an input source. Even when the input source is changed, an observer of a display finds that the quality of a displayed image has improved with respect to brilliance and resolution, without noticing any interruptions.

According to the present invention, the first and second threshold values are changed according to the level of the input video signal. Thus, an effect of sharpening an image expressed by the input video signal can be obtained uniformly over a range from a halftone level to a high-brightness level.

According to the present invention, since first and second parameters which are used for determining first and second threshold values can be externally supplied, the first and second threshold values can be externally adjusted.

According to the present invention, a signal portion of the input video signal which expresses an outline of an image is detected, and an outline compensation signal is added only to the signal portion. Thus, even when the input video signal includes noise, a malfunction of an outline compensation section, which may be caused due to the noise, can be prevented by using a detection result of an outline detection section.

In an outline component extraction section, the outline detection section, and a level detection section according to the present invention, delay elements and adders may be shared in the digital circuits of these sections so that the entire circuitry size can be reduced. Thus, the image emphasizing apparatus of the present invention can be readily produced at a low cost.

According to the present invention, first, second, and third parameters are changed according to the level of the input video signal. Further, a signal portion of the input video signal which expresses an outline of an image is detected according to the third threshold value, and an outline compensation signal is added only to the signal portion. Thus, a malfunction of an outline compensation section, which may be caused due to noise, can be prevented, while an effect of sharpening an image expressed by the input video signal can be obtained uniformly over a range from a halftone level to a high-brightness level.

According to the present invention, since first, second, and third parameters which are used for determining first, second, and third threshold values can be externally supplied, the first, second, and third threshold values can be externally adjusted.

According to the present invention, the average value of the input video signal within its every predetermined length of period is detected as a level of the input video signal. Thus, threshold values, which are calculated at a subsequent stage, are not influenced by the input video signal that varies with the passage of time. Further, an influence of noise which may be superimposed on the input video signal can be reduced.

According to the present invention, the level of an outline compensation signal can be adjusted by changing an externally-supplied coefficient.

According to the present invention, a process which is substantially equivalent to an outline compensation process performed by the above image emphasizing apparatus can be performed by a computer on original image data. Thus, the same effects as those achieved by the above image emphasizing apparatus can be obtained.

Thus, the invention described herein makes possible the advantages of providing an image emphasizing apparatus where the quality of a high-definition image including thin lines, small spots, etc., can be sufficiently improved by outline emphasization, while avoiding unnatural outline emphasization due to overshoot or undershoot.

These and other advantages of the present invention will become apparent to those skilled in the art upon reading and understanding the following detailed description with reference to the accompanying figures.

BRIEF DESCRIPTION OF THE DRAWINGS

FIG. 3 illustrates a relationship between filter coefficients and an input source determination signal in the outline component extraction circuit according to embodiment 1.

FIG. 8 illustrates a relationship between control inputs and a selected output in a first selector 53 of the outline correction circuit according to embodiment 1.

FIG. 9 illustrates a relationship between control inputs and a selected output in a second selector 56 of the outline correction circuit according to embodiment 1.

DESCRIPTION OF THE PREFERRED EMBODIMENTS

Hereinafter, embodiments of the present invention will be described with reference to the accompanying drawings.

<1. Embodiment 1>

First, embodiment 1 of the present invention is described with reference to FIGS. 1 through 10. It should be noted that, in the signal waveform diagram of FIG. 10, simplified schematic expression is employed. Further, even when a digital circuit is described as a specific circuit example, the waveform of a signal in the digital circuit is shown in the form of an analog waveform for the purpose of plainly illustrating an operation of the digital circuit.

<1-1. Overall Structure of the Image Emphasizing Apparatus According to Embodiment 1>

Figure 1:
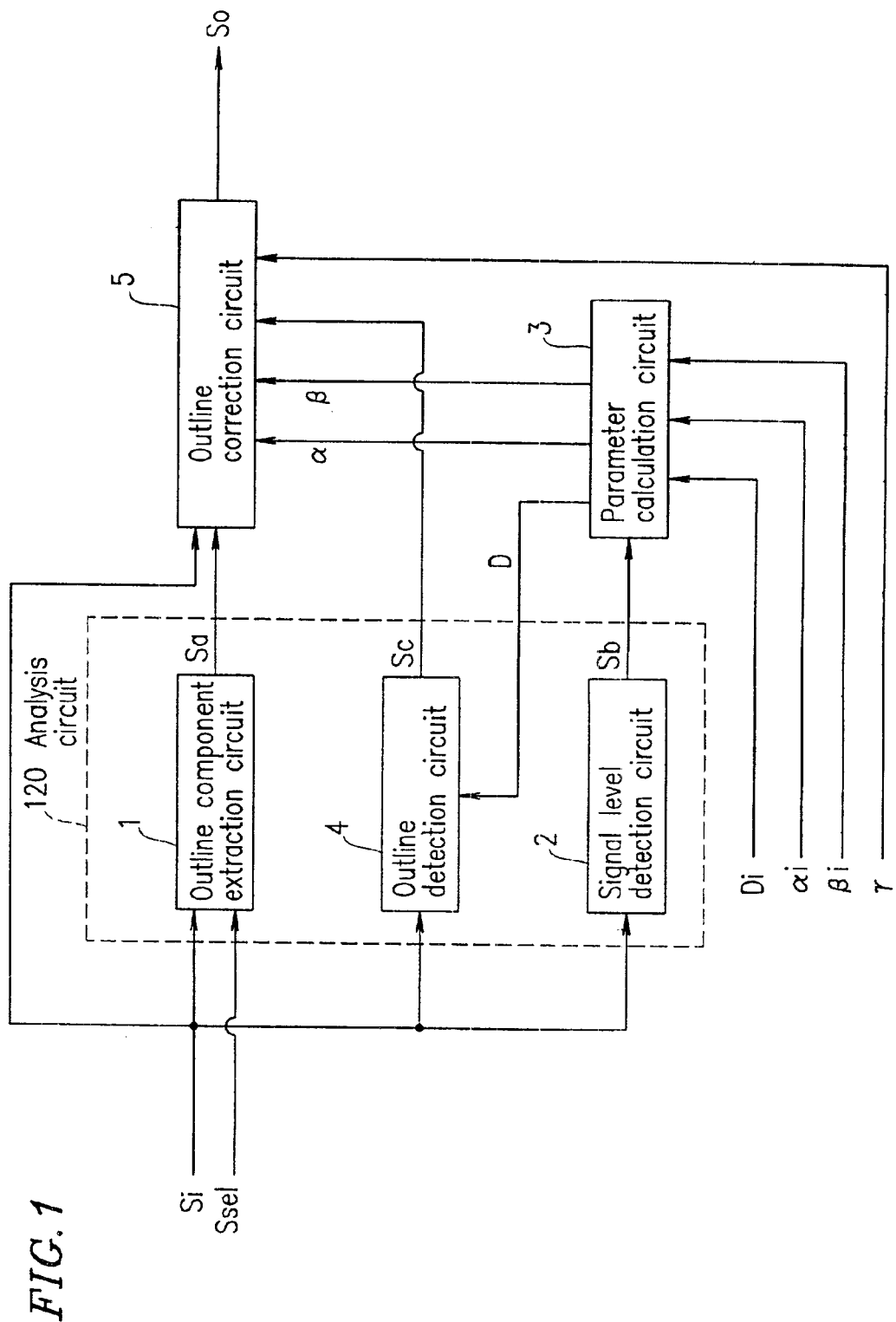
FIG. 1 is a block diagram showing a structure of an image emphasizing apparatus according to embodiment 1 of the present invention.

FIG. 1 is a block diagram showing a structure of an image emphasizing apparatus according to embodiment 1 of the present invention. This image emphasizing apparatus performs outline emphasizing ("edge emphasizing") processing on an externally-input video signal Si (hereinafter, "input video signal"), and outputs the processed video signal Sc (hereinafter, "output video signal"). The output video signal Sc is transmitted to an image display apparatus (not shown) such as a TV receiver or a liquid crystal display, so that an image expressed by the output video signal Sc is displayed thereon. In this embodiment, the input video signal Si is described as a brightness signal, but the input video signal Si which is input to the image emphasizing apparatus is not limited to a brightness signal. The input video signal Si may be a signal of any type so long as an image can be reproduced from the signal Si. Thus, for example, the input video signal Si may be a color signal or an RGB signal (primary color signal).

As shown in FIG. 1, the image emphasizing apparatus of embodiment 1 includes: an analysis circuit 120, a parameter calculation circuit 3 as a threshold calculation section; and an outline correction circuit 5 as an outline correction section. The analysis circuit 120 includes: an outline component extraction circuit 1 as an outline component extraction section; a signal level detection circuit 2 as a level detection section; and an outline detection circuit 4 as an outline detection section. The analysis circuit 120 receives a video signal Si and an input source determination signal Ssel. The input source determination signal Ssel is a signal which indicates the type of the video signal Si. For example, when the video signal Si is a video signal based on a HDTV (High Definition Television) method, the input source determination signal Ssel is at a high (H) level. When the video signal Si is a video signal based on a NTSC (National Television System Committee) method, the input source determination signal Ssel is at a low (L) level.

In the above image emphasizing apparatus, the outline component extraction circuit 1 extracts from the input video signal Si, according to the input source determination signal Ssel, an outline component Sa which corresponds to an outline of an image expressed by the input video signal Si (also referred to as "edge component" or "outline signal"). The signal level detection circuit 2 detects a signal level Lb of the input video signal Si and outputs a signal having a signal value equal to the signal level Lb (hereinafter, "a level signal Sb"). The parameter calculation circuit 3 externally receives first parameter $\alpha i$, second parameter $\beta i$, and third parameter Di, and calculates, based on external parameters $\alpha i$, $\beta i$, and Di, an excessive emphasis correction threshold value $\alpha$ for suppressing excessive emphasis of an outline (first threshold), a fine component emphasis threshold value $\beta$ for emphasizing an outline of a fine detailed image (second threshold), and an outline detection threshold D for outline detection (third threshold). The outline detection circuit 4 compares a value of a calculated variation of the input video signal Si with outline detection threshold D, and outputs based on the comparison result an outline detection signal Sc which indicates the presence/absence of an outline. The outline correction circuit 5 uses the outline component Sa output from the outline component extraction circuit 1, the outline detection signal Sc output from the outline detection circuit 4, the excessive emphasis correction threshold value $\alpha$ and the fine component emphasis threshold value $\beta$ output from the parameter calculation circuit 3, and a coefficient $\gamma$ externally supplied as a gain adjustment parameter so as to perform signal processing for outline emphasization on the input video signal Si. The outline correction circuit 5 generates an output video signal Sc as a result of this signal processing. It should be noted that, for convenience of illustration, a delay of a signal which is caused due to a processing time in each circuit, and a delay circuit which is generally used only for correcting such a signal delay, are herein omitted.

<1-2. Structure of Outline Component Extraction Circuit>

Figure 2:
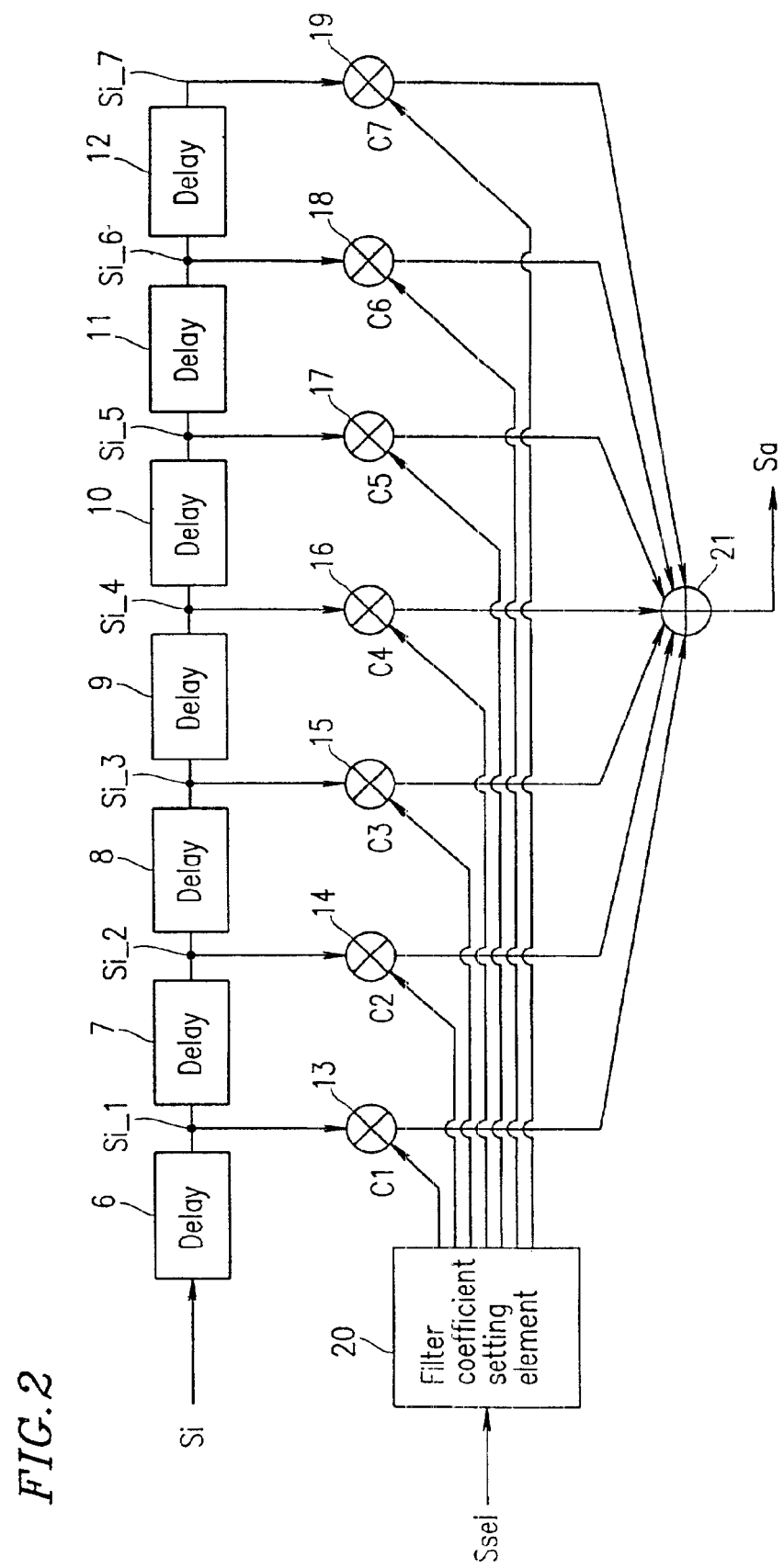
FIG. 2 is a schematic circuit diagram showing an exemplary structure of an outline component extraction circuit according to embodiment 1.

The outline component extraction circuit 1 provided in the analysis circuit 120 of the image emphasizing apparatus according to embodiment 1 is formed by a high pass filter. For example, a secondary differentiation filter is used in the outline component extraction circuit 1 so as to extract a secondary differentiation component of the input video signal Si and output the extracted secondary differentiation component as the outline component Sa. FIG. 2 is a schematic circuit diagram showing an exemplary structure of the outline component extraction circuit 1. In this example, the outline component extraction circuit 1 is implemented as a 7-tap secondary differentiation filter which has seven unit delay elements 6–12, seven multipliers 13–19, a filter coefficient setting element 20, and an adder 21. The unit delay element is an element which delays a signal input thereto by one pixel of the input video signal Si. The filter coefficient setting element 20 sets coefficients C1–C7 according to the externally-supplied input source determination signal Ssel. These coefficients C1–C7 are supplied to the multipliers 13–19, respectively. The unit delay elements 6–12 are connected in series in this order, and the leading unit delay element 6 receives the input video signal Si. In this arrangement, delayed video signals Si_1 to Si_7 are obtained by sequentially delaying the input video signal Si. Herein, a delayed video signal Si_k is a signal delayed with respect to the input video signal Si by k pixels (for k=1, 2, . . . , 7). These delayed video signals Si_1 to Si_7 are supplied to the seven multipliers 13–19, respectively. Each of the multipliers 13–19 multiplies the supplied delayed video signal by a supplied coefficient. That is, a multiplier denoted by "12+k" multiplies by a coefficient Ck a signal Si_k which has been delayed with respect to the input video signal Si by k pixels (for k=1, 2, . . . , 7). The adder 21 adds up the results of multiplication in the multipliers 13–19 so as to generate a secondary differentiation component of the input video signal Si. The thus-generated secondary differentiation component is output from the outline component extraction circuit 1 as the outline component Sa of the input video signal Si.

In such a structure, by changing the coefficients C1–C7 set by the filter coefficient setting element 20, filters having various characteristics can be structured as the outline component extraction circuit 1. For example, since the frequency of the input video signal Si differs between the NTSC method and the HDTV method, the filter can be changed as shown in FIG. 3 according to the input source determination signal Ssel. In this example, when the video signal Si is a video signal based on the HDTV method, the input source determination signal Ssel is at a high (H) level. When the video signal Si is a video signal based on the NTSC method, the input source determination signal Ssel is at a low (L) level.

<1-3. Structure of Signal Level Detection Circuit>

Figure 4:
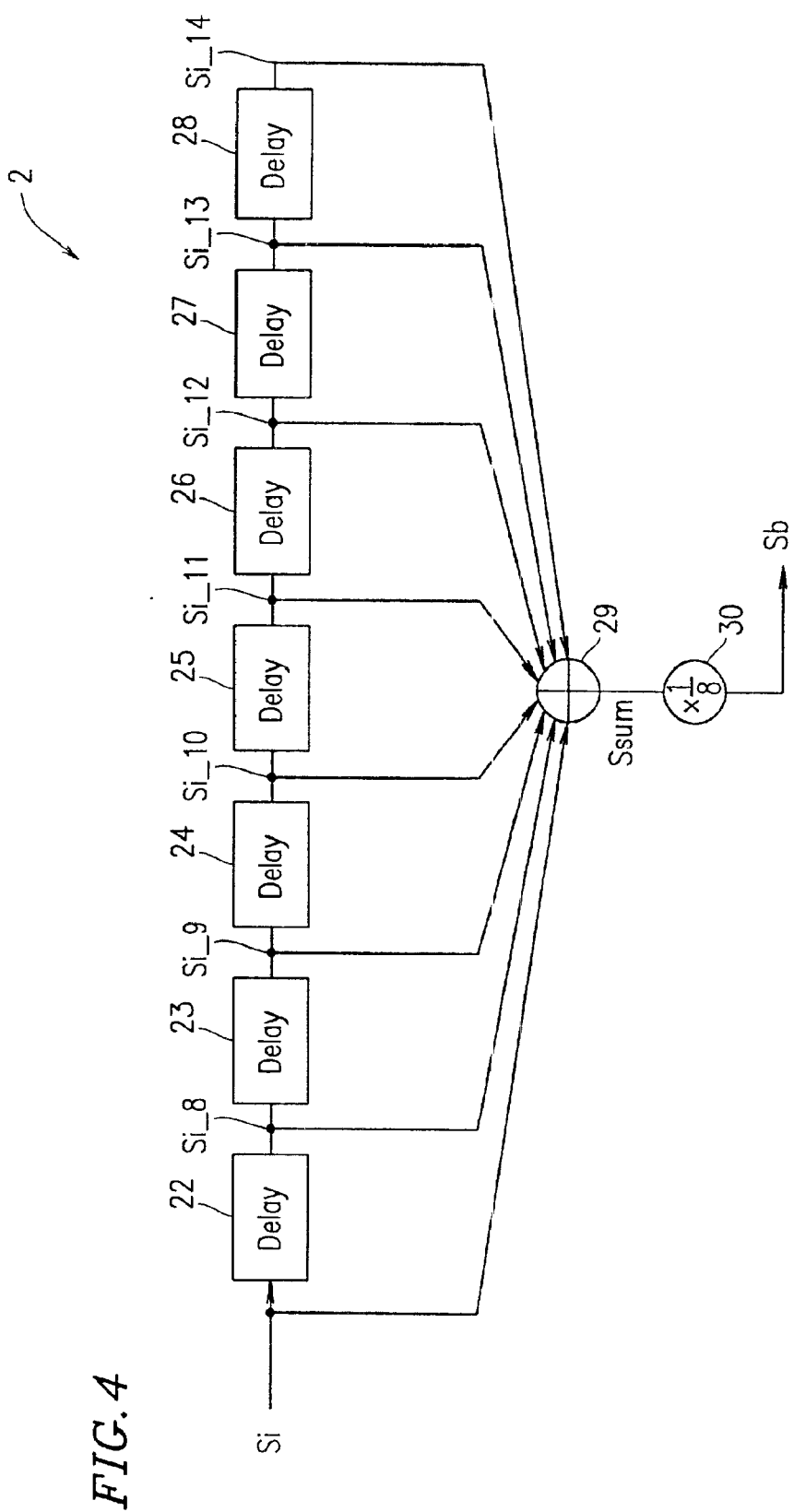
FIG. 4 is a schematic circuit diagram showing an exemplary structure of a signal level detection circuit according to embodiment 1.

Examples of a signal level detected by the signal level detection circuit 2 provided in the analysis circuit 120 of the image emphasizing apparatus according to embodiment 1 include an average value of a plurality of pixels around a target pixel in an image expressed by the video signal Si which is selected during the outline emphasization processing performed by the image emphasizing apparatus of the present invention, a signal level of the target pixel, or the like. FIG. 4 is a schematic circuit diagram showing an exemplary structure of the signal level detection circuit 2. In this example, the signal level detection circuit 2 outputs an average value of eight neighboring pixels around a target pixel in an image expressed by the video signal Si, as the level signal Sb which indicates the signal level Lb. The signal level detection circuit 2 includes unit delay elements 22–28, an adder 29, and a multiplier 30. The unit delay elements 22–28 are connected in series in this order, and the leading unit delay element 22 receives the input video signal Si. In this arrangement, delayed video signals Si_8 to Si_14 are obtained by sequentially delaying the input video signal Si. Herein, a delayed video signal Si_k is a signal delayed with respect to the input video signal Si by (k−7) pixels (for k=8, 9, . . . , 14). These delayed video signals Si_8 to Si_14, i.e., signals which have been delayed with respect to the input video signal Si by one to seven pixels, are supplied to the adder 29. The adder 29 adds up eight video signals, i.e., the input video signal Si and the delayed video signals Si_8 to Si_14, so as to generate a signal Ssum as a sum total of the eight video signals. The multiplier 30 multiplies the total signal Ssum by "⅛" so as to output, as a level signal Sb, a signal which has a signal value equal to an average value of the neighboring eight pixels around the target pixel. The value of the level signal Sb is the signal level Lb to be detected (>0). Alternatively, in an example where a value of a target pixel is employed as a signal level, the delayed video signal Si_11 in the above structure shown in FIG. 4 is output as the level signal Sb.

<1-4. Structure of Parameter Calculation Circuit>

Figure 5:
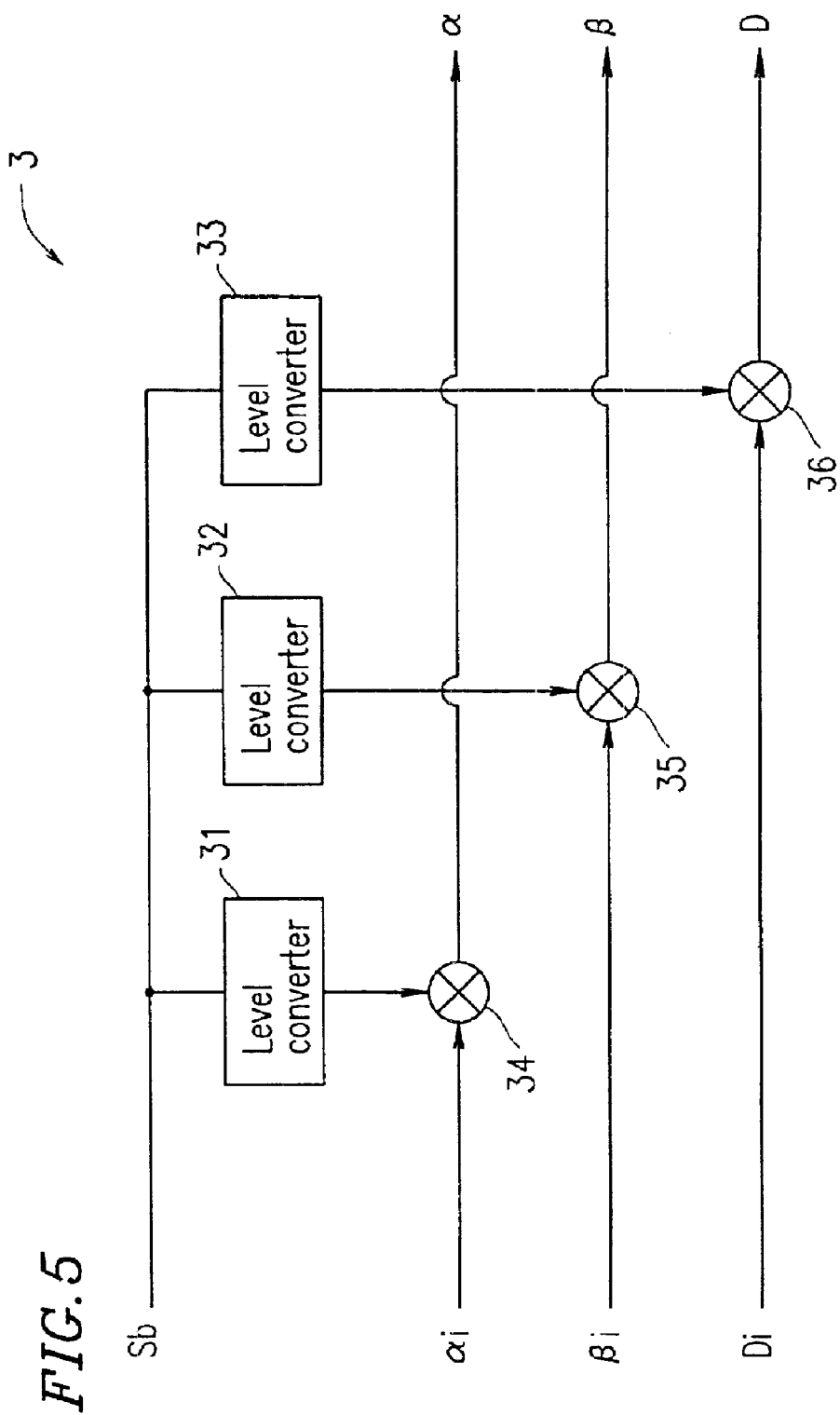
FIG. 5 is a schematic circuit diagram showing an exemplary structure of a parameter calculation circuit according to embodiment 1.

FIG. 5 is a schematic circuit diagram showing an exemplary structure of the parameter calculation circuit 3 provided in the image emphasizing apparatus according to embodiment 1. In this example, the parameter calculation circuit 3 includes three level converters 31–33 and three multipliers 34–36. The level converters 31–33 convert the level of the level signal Sb to a level which is consistent with first to third parameters $\alpha i$, $\beta i$, and $Di$, respectively. For example, each of the level converters 31–33 is implemented as a multiplier, a bit shifter, or the like. The multiplier 34 multiplies the externally-supplied first parameter $\alpha i$ by a value of the level signal Sb which has been level-converted by the level converter 31, and outputs the multiplication result as the excessive emphasis correction threshold value $\alpha$. The multiplier 35 multiplies the externally-supplied second parameter $\beta i$ by a value of the level signal Sb which has been level-converted by the level converter 32, and outputs the multiplication result as the fine component emphasis threshold value $\beta$. The multiplier 36 multiplies the externally-supplied third parameter Di by a value of the level signal Sb which has been level-converted by the level converter 33, and outputs the multiplication result as the outline detection threshold value D.

<1-5. Structure of Outline Detection Circuit>

Figure 6:
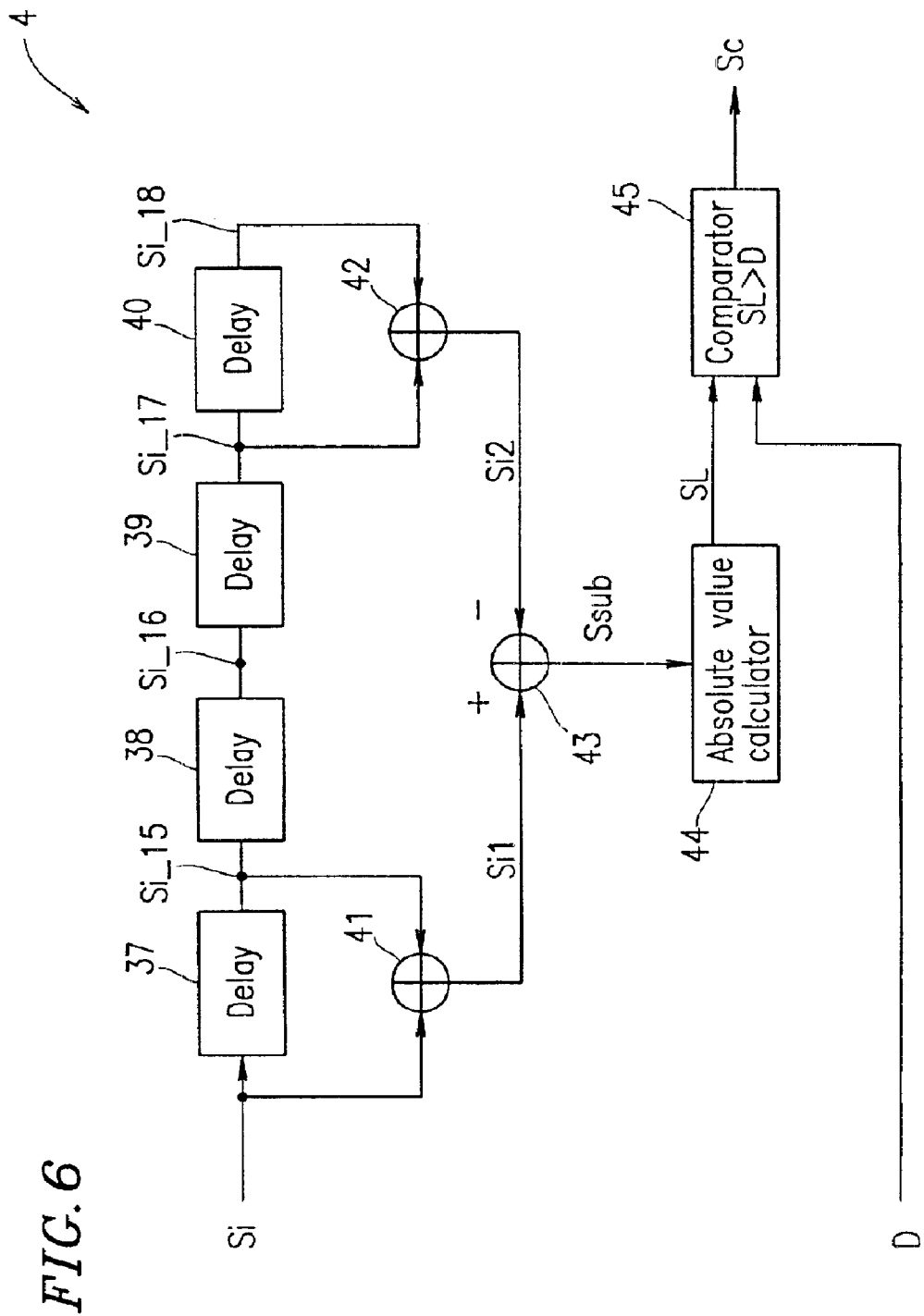
FIG. 6 is a schematic circuit diagram showing an exemplary structure of an outline detection circuit according to embodiment 1.

FIG. 6 is a schematic circuit diagram showing an exemplary structure of the outline detection circuit 4 provided in the analysis circuit 120 of the image emphasizing apparatus according to embodiment 1. In this example, the outline detection circuit 4 includes four unit delay elements 37–40, three adders 41–43, an absolute value calculator 44, and a comparator 45. The unit delay elements 37–40 are connected in series in this order, and the leading unit delay element 37 receives the input video signal Si. In this arrangement, delayed video signals Si_15 to Si_18 are obtained by sequentially delaying the input video signal Si. The adder 41 adds up the delayed video signal Si_15, which has been delayed with respect to the input video signal Si by one pixel, and the input video signal Si, and outputs the obtained result of addition as a first sum signal Si1. The adder 42 adds up the delayed video signal Si_17, which has been delayed with respect to the input video signal Si by three pixels, and the delayed video signal Si_18 which has been delayed with respect to the input video signal Si by four pixels, and outputs the obtained result of addition as a second sum signal Si2. When the delayed video signal Si_16 is a target signal, the first sum signal Si1 and the second sum signal Si2 each respectively correspond to the sum of two pixels horizontally adjacent to the left and right sides of a pixel which is expressed by the target delayed video signal Si_16 (target pixel). The adder 43 subtracts the second sum signal Si2 from the first sum signal Si1 so as to generate a signal Ssub which indicates a difference between the first sum signal Si1 and the second sum signal Si2 (hereinafter, "difference signal"). The absolute value calculator 44 generates an absolute value signal SL so as to have a signal value equal to the absolute value of the value of the difference signal Ssub. The absolute value signal SL indicates a variation of the input video signal Si (i.e., the size of an outline). The absolute value signal SL has a large value when the signal level difference between the signal levels of the pixels horizontally adjacent to the left and right sides of the target pixel which is expressed by the delayed video signal Si_16 is large, i.e., when an outline exists. The comparator 45 compares the absolute value signal SL and outline detection threshold D, and outputs based on the comparison result an outline detection signal Sc which indicates the presence/absence of an outline. When the value of the absolute value signal SL is greater than outline detection threshold D, the outline detection signal Sc is at a high (H) level. When the value of the absolute value signal SL is equal to or smaller than outline detection threshold D, the outline detection signal Sc is at a low (L) level. The outline detection signal Sc at the H level indicates that an outline exists at a position of the target pixel, and the outline detection signal Sc at the L level indicates that an outline does not exist at a position of the target pixel.

<1-6. Structure of Outline Correction Circuit>

Figure 7:
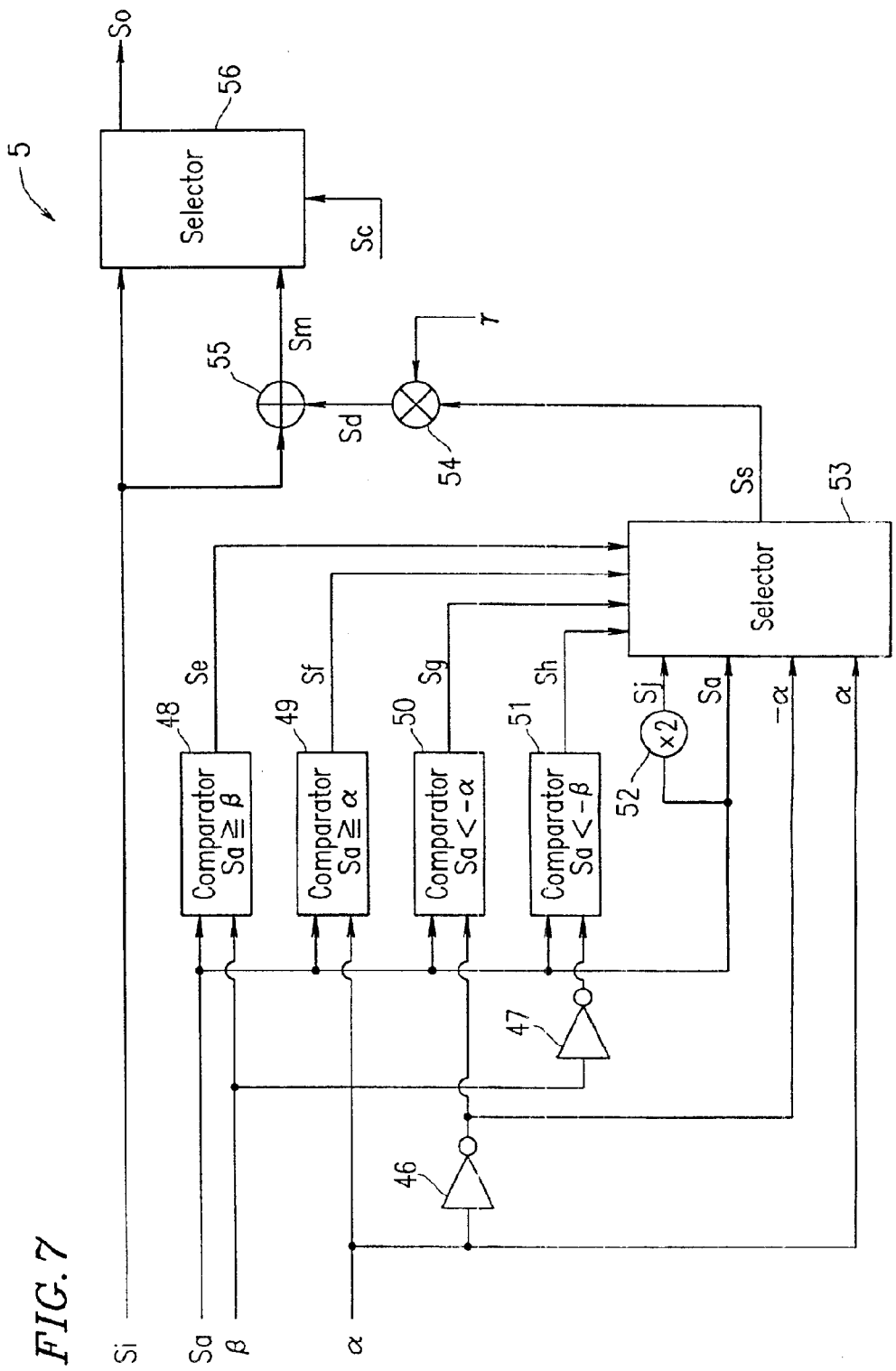
FIG. 7 is a schematic circuit diagram showing an exemplary structure of an outline correction circuit according to embodiment 1.

FIG. 7 is a schematic circuit diagram showing an exemplary structure of the outline correction circuit 5 provided in the image emphasizing apparatus according to embodiment 1. In this example, the outline correction circuit 5 corrects an outline component detected in a thin line or a small spot such that the outline component is increased two times. The outline correction circuit 5 includes inverters 46 and 47, comparators 48–51, multipliers 52 and 54, a first selector 53 and a second selector 56, and an adder 55. Among these components, the inverters 46 and 47, the comparators 48–51, the multiplier 52, and the first selector 53 form an emphasis signal generation section. The inverter 46 generates an inverted excessive emphasis correction threshold value $-\alpha$ by inverting the sign of the excessive emphasis correction threshold value $\alpha$ (>0). The inverter 47 generates an inverted fine component emphasis threshold value $-\beta$ by inverting the sign of the fine component emphasis threshold value $\beta$ (>0). The comparator 48 receives and compares the outline component Sa and the fine component emphasis threshold value $\beta$. The comparator 48 outputs a first comparison result signal Se, which is at a H level when the outline component Sa is equal to or greater than the fine component emphasis threshold value $\beta$, and which is at a L level when the outline component Sa is smaller than the fine component emphasis threshold value $\beta$. The comparator 49 receives and compares the outline component Sa and the excessive emphasis correction threshold value $\alpha$. The comparator 49 outputs a second comparison result signal Sf, which is at a H level when the outline component Sa is equal to or greater than the excessive emphasis correction threshold value $\alpha$, and which is at a L level when the outline component Sa is smaller than the excessive emphasis correction threshold value $\alpha$. The comparator 50 receives and compares the outline component Sa and the inverted excessive emphasis correction threshold value $-\alpha$. The comparator 50 outputs a third comparison result signal Sg, which is at a H level when the outline component Sa is smaller than the inverted excessive emphasis correction threshold value $-\alpha$, and which is at a L level when the outline component Sa is equal to or greater than the inverted excessive emphasis correction threshold value $-\alpha$. The comparator 51 receives and compares the outline component Sa and the inverted fine component emphasis threshold value $-\beta$. The comparator 51 outputs a fourth comparison result signal Sh, which is at a H level when the outline component Sa is smaller than the inverted fine component emphasis threshold value $-\beta$, and which is at a L level when the outline component Sa is equal to or greater than the inverted fine component emphasis threshold value $-\beta$. The multiplier 52 multiplies the outline component Sa by "2", and outputs the multiplication result as an amplified outline component Sj.

The first selector 53 receives, as data inputs, the outline component Sa, the amplified outline component Sj, the inverted excessive emphasis correction threshold value $-\alpha$, and the excessive emphasis correction threshold value $\alpha$. The first selector 53 also receives, as control inputs, the first through fourth comparison result signals Se, Sf, Sg, and Sh. The first selector 53 selects any of the four data inputs Sj, Sa, −α, and α, according to a combination of the four control inputs Se, Sf, Sg, and Sh shown in FIG. 8, i.e., the magnitude relationship between the outline component Sa and each of β, α, −α, and −β, and outputs the selected data input as an outline emphasizing signal Ss. FIG. 8 shows the relationship between the control inputs and the selected output in the first selector 53. In FIG. 8, "H" denotes a high (H) level, "L" denotes a low (L) level, and "X" denotes any level (any of the H level or the L level). According to FIG. 8, when the first comparison result signal Se is at the H level, i.e., Sa≧β, the first selector 53 selects the amplified outline component Sj. When the first comparison result signal Se is at the L level, and the second comparison result signal Sf is at the H level, i.e., β>Sa≧α, the first selector 53 selects the excessive emphasis correction threshold value α. When both the second and third comparison result signals Sf and Sg are at the L level, i.e., α>Sa≧−α, the first selector 53 selects the outline component Sa. When the third comparison result signal Sg is at the H level, and the fourth comparison result signal Sh is at the L level, i.e., −α>Sa≧−β, the first selector 53 selects the inverted excessive emphasis correction threshold value −α. When the fourth comparison result signal Sh is at the H level, i.e., Sa<−β, the first selector 53 selects the amplified outline component Sj. The signal selected in this way by the first selector 53 is input to the multiplier 54 as the outline emphasizing signal Ss. The multiplier 54 also receives coefficient γ which is externally supplied as a gain adjustment parameter. The multiplier 54 multiplies the outline emphasizing signal Ss by coefficient γ, and outputs the multiplication result as an outline compensation signal Sd.

The adder 55 adds the outline compensation signal Sd to the input video signal Si, and outputs the addition result as an outline corrected signal Sm. The second selector 56 receives the outline corrected signal Sm and the input video signal Si as data inputs. The second selector 56 also receives, as a control input, the outline detection signal Sc output from the outline detection circuit 4. The second selector 56 selects the outline corrected signal Sm when the outline detection signal Sc is at the H level, and selects the input video signal Si when the outline detection signal Sc is at the L level. The second selector 56 outputs the selected signal as a video signal Sc which has been processed for outline emphasization. Thus, the image emphasizing apparatus of embodiment 1 outputs as the video signal Sc the outline corrected signal Sm, which has been obtained by adding the outline compensation signal Sd to the input video signal Si, only when the outline detection circuit 4 detects an outline. When the outline detection circuit 4 does not detect an outline, the image emphasizing apparatus outputs the input video signal Si as the video signal Sc. That is, the outline corrected signal Sm, which has been obtained by adding the outline compensation signal Sd to the input video signal Si, is output as the video signal Sc only when an outline exists at a target pixel in an image expressed by the input video signal Si. When an outline does not exist at the target pixel, the input video signal Si is output as the video signal Sc. In the outline correction circuit 5 of embodiment 1, outline emphasization is achieved by adding the outline compensation signal Sd only to a signal component of the input video signal Si which corresponds to an outline of an image.

<1-7. Function>

Figure 10:
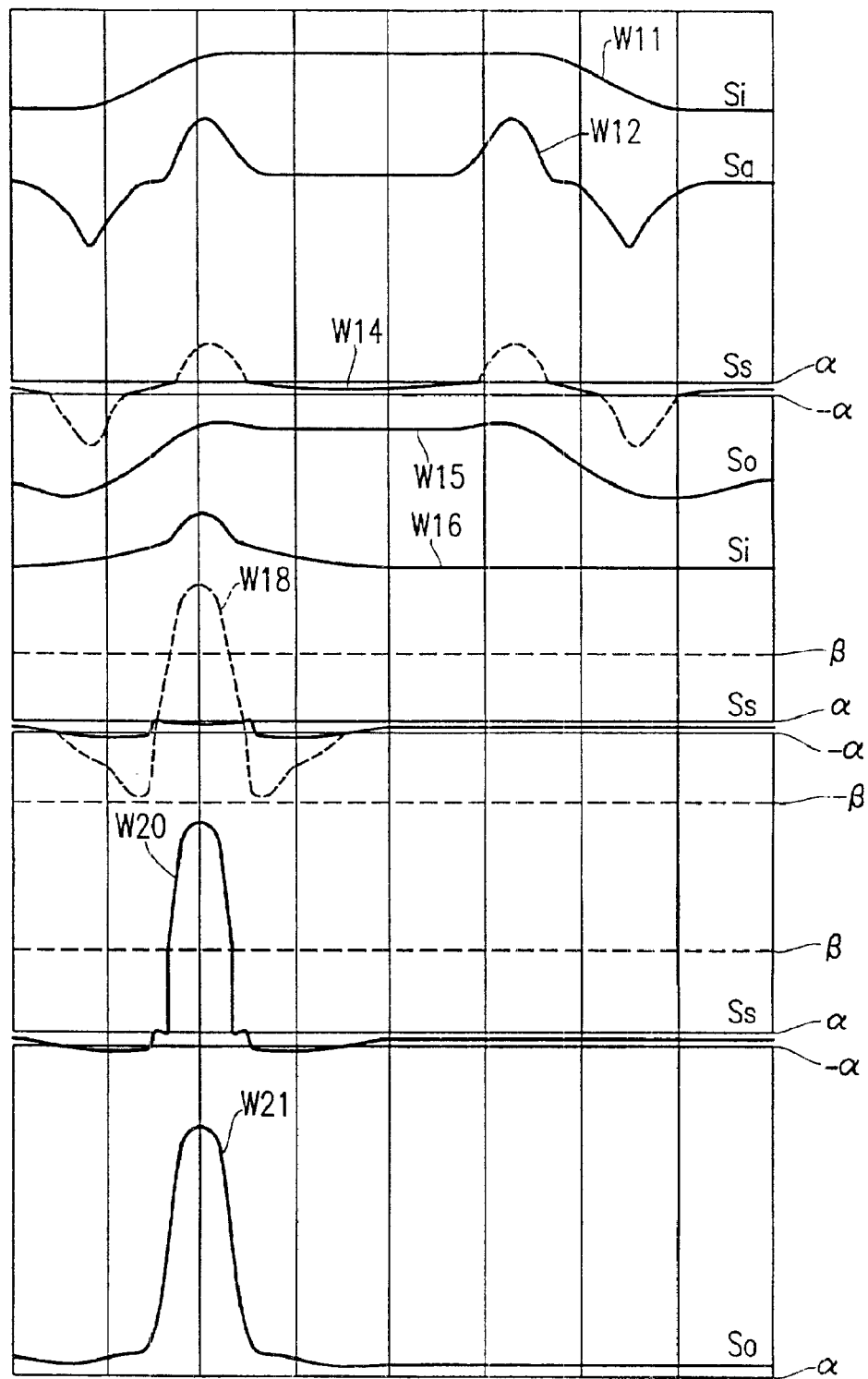
FIG. 10 is a signal waveform diagram illustrating an operation of the image emphasizing apparatus according to embodiment 1.

In the image emphasizing apparatus of embodiment 1 having the above structure, in the case where the input video signal Si has a waveform W11 shown in FIG. 10, the outline component extraction circuit 1 extracts the outline component Sa which is shown in the form of a signal having a waveform W12 of FIG. 10. Further, the excessive emphasis correction threshold value α and the inverted excessive emphasis correction threshold value −α, which have been adjusted so as to be conformable to the signal level Lb of the input video signal Si, are used to limit the absolute value (amplitude) of the outline emphasizing signal Ss to a value equal to or smaller than the excessive emphasis correction threshold value α. That is, a signal portion of the outline component Sa which is greater than the value α is modified such that the value of the signal portion is equal to the value α; and a signal portion of the outline component Sa which is smaller than the value −α is modified such that the value of the signal portion is equal to the value −α. As a result, the outline emphasizing signal Ss has the waveform W14 (the remaining signal portion of the outline emphasizing signal Ss has the same waveform as that of the outline component Sa). That is, the outline emphasizing signal Ss is generated by restricting the amplitude of a signal portion of the outline component Sa whose amplitude is greater than the excessive emphasis correction threshold value α, to the value α. The thus-generated outline emphasizing signal Ss is gain-adjusted so as to obtain an outline compensation signal Sd, and the outline compensation signal Sd is added to the input video signal Si so as to generate an output video signal Sc. In this case, the output video signal Sc has a waveform W15 where overshoot and undershoot are suppressed as shown in FIG. 10.

Alternatively, in the case where the input video signal Si has a waveform W16 shown in FIG. 10 (i.e., in the case where the input video signal Si has a waveform which expresses a fine detailed image portion such as a thin line or a small spot), the conventional example can only provide a small and insufficient improvement in the quality of such an image portion. However, according to embodiment 1, a waveform having a sufficiently emphasized outline component can be obtained even in a fine detailed image portion by using the fine component emphasis threshold value β and the inverted fine component emphasis threshold value −β. That is, an outline component Sa, which is extracted from the input video signal Si having the waveform W16 shown in FIG. 10, has a broken line waveform W18 shown in FIG. 10. A signal portion of the outline component Sa whose absolute value is equal to or smaller than the threshold value β is modified such that the amplitude (absolute value) of the signal portion is equal to or smaller than the value α. A signal portion of the outline component Sa whose absolute value exceeds the threshold value β is replaced with a corresponding portion of the amplified outline component Sj (which is a signal having an amplitude two times greater than that of the outline component Sa). As a result, an outline emphasizing signal Ss having a waveform W20 shown in FIG. 10 is generated. The thus-generated outline emphasizing signal Ss is gain-adjusted so as to obtain an outline compensation signal Sd, and the outline compensation signal Sd is added to the input video signal Si so as to generate an output video signal Sc. In this case, the output video signal Sc has a waveform W21 where an outline component of a fine detailed image is further emphasized as shown in FIG. 10.

<1-8. Setting of Excessive Emphasis Correction Threshold Value α and Fine Component Emphasis Threshold Value β>

As described above, the image emphasizing apparatus according to embodiment 1 is designed such that, when an outline of an image is emphasized by sharpening a rising edge and a falling edge in the input video signal Si, the emphasized image is prevented from resulting in an unnatural image due to addition of undershoot or overshoot. Specifically, in the image emphasizing apparatus according to embodiment 1, the level of outline emphasization is selectively controlled by using the excessive emphasis correction threshold value α (and the inverted excessive emphasis correction threshold value −α). Further, the level of outline emphasization for a fine detailed image including thin lines, small spots, etc., is selectively controlled by using the fine component emphasis threshold value β (and inverted fine component emphasis threshold value −β) such that the fine detailed image is sufficiently emphasized. Hereinafter, methods for setting the excessive emphasis correction threshold value α and the fine component emphasis threshold value β, which are used in selective control of the level of outline emphasization, are specifically described.

The outline component extraction circuit 1 is typically implemented as a secondary differentiation filter. An output of the secondary differentiation filter exhibits the maximum absolute value at an initial point (hereinafter, "A-point") and an end point (hereinafter, "B-point") of a rising or falling edge in an original waveform of an input video signal. For example, when the original waveform is a rising edge, in an output of the secondary differentiation filter, A-point (initial point) has a peak point protruding in a negative direction (hereinafter, "A-peak point"), and B-point (end point) has a peak point protruding in a positive direction (hereinafter, "B-peak point"). When the output of the secondary differential filter is added as an outline emphasizing signal to the input video signal (original signal), undershoot occurs at A-peak point, and overshoot occurs at B-peak point. The excessive emphasis correction threshold value α is used to avoid the occurrence of undershoot and overshoot. Thus, the excessive emphasis correction threshold value α and the first parameter αi, which is used to determine the threshold value α, are determined such that the values of A- and B-peak points in the output of the secondary differentiation filter (which corresponds to an outline component) are each suppressed to a level where an unnatural image is not generated through outline emphasization (i.e., a level where an edge of an outline of an image is not conspicuous).

Figure 11:
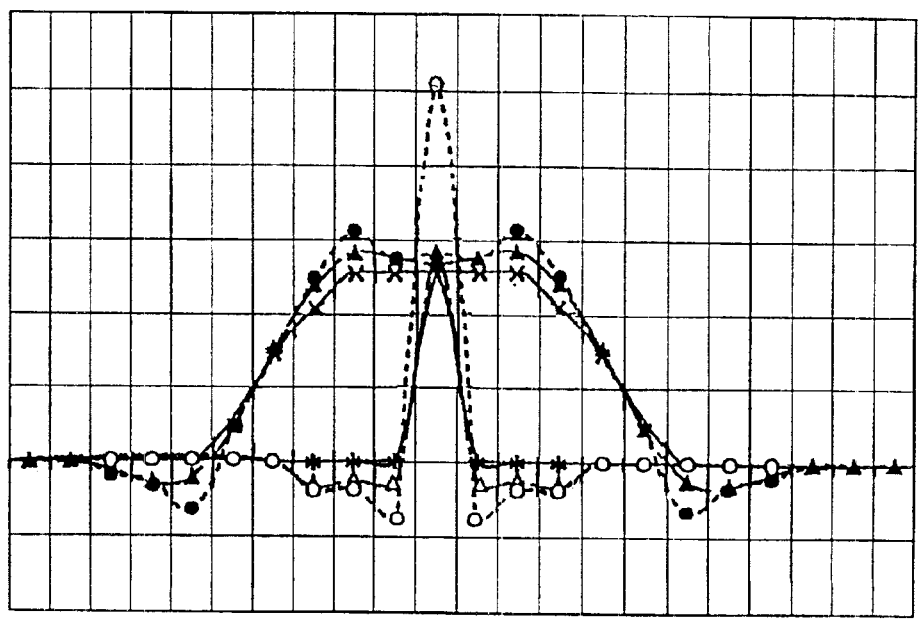
FIG. 11 is a signal waveform diagram for illustrating a problem which may occur when only excessive emphasis correction is performed in an outline emphasization process.

However, with only suppression of undershoot and overshoot, which may be added through outline emphasization, by using the excessive emphasis correction threshold value α, the level of outline emphasization for a fine detailed image including thin lines, small spots, etc., is insufficient. FIG. 11 shows signal waveforms of a normal width line and a thin line which have been subjected to outline emphasization with excessive emphasis correction, together with signal waveforms of a normal width line and a thin line which have been subjected to outline emphasization without excessive emphasis correction (i.e., signal waveforms obtained only by adding secondary differentiation component). In FIG. 11, a curve with "X" marks represents a waveform of an original normal width line; a curve with "●" marks represents a waveform of a normal width line which has been subjected to outline emphasization without excessive emphasis correction; and a curve with "▲" marks represents a waveform of a normal width line which has been subjected to outline emphasization with excessive emphasis correction. As seen from comparison of these curves, when a normal width line image is subjected to outline emphasization with excessive emphasis correction, arising edge and a falling edge of a waveform can be sharpened while suppressing undershoot and overshoot. In FIG. 11, a curve with "✕" marks represents a waveform of an original thin line, a curve with "○" marks represents a waveform of a thin line which has been subjected to outline emphasization without excessive emphasis correction; and a curve with "Δ" marks represents a waveform of a thin line which has been subjected to outline emphasization with excessive emphasis correction. As seen from comparison of these curves, when a fine detailed image, such as a thin line image, is subjected to outline emphasization with excessive emphasis correction, an effect of outline emphasization is poor in comparison to a case where outline emphasization is performed without excessive emphasis correction.

Figure 12:
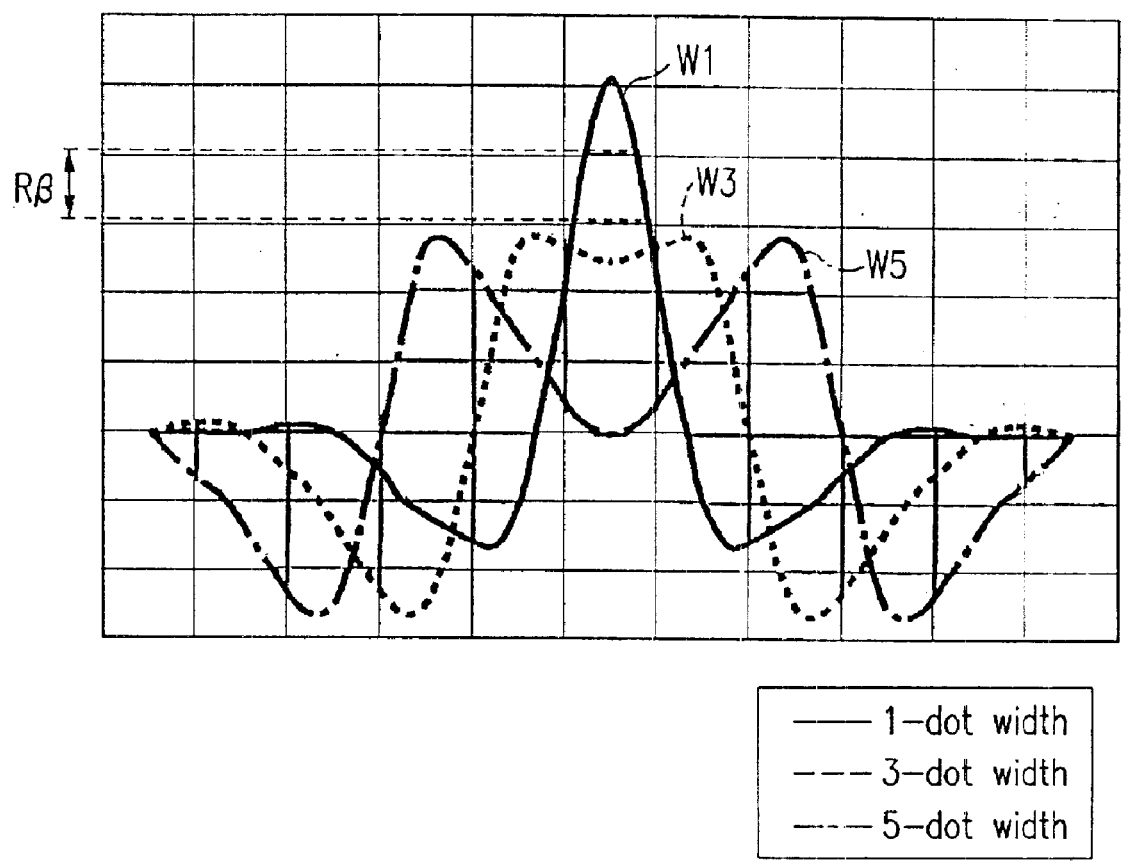
FIG. 12 is a signal waveform diagram that illustrates a method for determining a fine component emphasis threshold value β which is used in an outline emphasization process of the image emphasizing apparatus according to embodiment 1.

According to embodiment 1 of the present invention, the fine component emphasis threshold value β is used in order to obtain a sufficient effect of outline emphasization when a fine detailed image is subjected to outline emphasization with excessive emphasis correction. Specifically, when the outline component Sa is greater than the fine component emphasis threshold value β, it is determined that the outline component Sa corresponds to an outline of the fine detailed image, and then, outline emphasization is performed on the outline component Sa without excessive emphasis correction. Thus, the fine component emphasis threshold value β is determined depending on the maximum width of a line that is regarded as a "thin line" or the maximum diameter of a spot that is regarded as a "small spot". FIG. 12 is a signal waveform diagram showing secondary differentiation components which are outline components of three types of line images having different line widths. A solid line curve is a waveform W1 which represents an outline component of a thin line image having a 1-dot width. A dotted line curve is a waveform W3 which represents an outline component of a thin line image having a 3-dot width. A dashed line curve is a waveform W5 which represents an outline component of a thin line image having a 5-dot width. The fine component emphasis threshold value β can be determined based on the waveforms W1, W3, and W5 of the outline components. For example, when it is assumed that a line image having a line width of 2 dots or smaller is regarded as a fine detailed image, the fine component emphasis threshold value β is determined so as to be within a range which is greater than the maximum value of the waveform W3 of the 3-dot width line image, and which is sufficiently smaller than the maximum value of the waveform W1 of the 1-dot width line image, i.e., so as to be within a range shown by arrow Rβ in FIG. 12. By using the fine component emphasis threshold value β within the range Rβ, in a line image (or spot image) having a line width of 3 dots or greater, generation of an unnatural image (fringe) due to overshoot or undershoot is suppressed by means of excessive emphasis correction performed based on the value α. Further, in a line image (or spot image) having a line width of less than 3 dots, sufficient outline emphasization is achieved based on the fine component emphasis threshold value β. In this example, as a matter of course, value β is greater than the value α (β>α).

<1-9. Effect>

As described above, according to embodiment 1 of the present invention, generation of an unnatural image (fringe) due to overshoot and undershoot which may be added to a video signal through an outline emphasization process, is suppressed by using the excessive emphasis correction threshold value α. Further, outline emphasization is sufficiently performed on a fine detailed image by using the fine component emphasis threshold value β.

The excessive emphasis correction threshold value α is calculated based on the signal level Lb detected in the input video signal Si and externally-supplied first parameter αi. The fine component emphasis threshold value β is calculated based on the signal level Lb and externally-supplied second parameter βi. Then, an outline detection signal Sc is generated based on a comparison between a variation of the input video signal Si and outline detection threshold D. Based on the generated outline detection signal Sc, i.e., only when an outline is detected in the input video signal Si, a signal which has been subjected to outline emphasization is output as a video signal Sc. Outline detection threshold D is calculated based on the signal level Lb and externally-supplied third parameter Di. In embodiment 1, since the excessive emphasis correction threshold value α, the fine component emphasis threshold value β, and the outline detection threshold D, which are used in an outline emphasization process, are calculated in the above-described manner, a thin line in an image expressed by the input video signal Si can be effectively and uniformly emphasized over a range from a halftone level to a high-brightness level. This is achieved because the excessive emphasis correction threshold value α, the fine component emphasis threshold value β, and the outline detection threshold D are changed according to the signal level Lb of the input video signal Si. Furthermore, it is because the lower limits are set on externally-supplied parameters αi, βi, and Di so that the emphasization process is not performed on a very small noise component, whereby an error due to a noise can be prevented.

In view of the above, an output video signal Sc from the image emphasizing apparatus according to embodiment 1 of the present invention can be displayed on an image display apparatus, such as a CRT display, a liquid crystal display, a plasma display, or the like, in the form of an image with improved quality obtained through an outline compensation process. Further, according to the image emphasizing apparatus of embodiment 1, the brilliance of a thin line and a small spot, which is difficult to express based on a video signal subjected to a conventional outline correction, can be improved, while generation of an unnatural image due to addition of undershoot or overshoot is prevented by selectively controlling the level of outline emphasization with the fine component emphasis threshold value β. Thus, the image emphasizing apparatus of embodiment 1 is especially effective in improving the quality of an image displayed on a high-definition display.

Furthermore, according to embodiment 1 of the present invention, an outline emphasization process has a perfect correlation with an input video signal Si. Moreover, in this outline emphasization process, since an outline compensation component Sd is added to the input video signal Si in a natural and smooth manner, an observer of a display finds that the quality of a displayed image is improved in respect to brilliance and resolution, without noticing any interruptions.

<2. First Variation of Embodiment 1>

Figure 13:
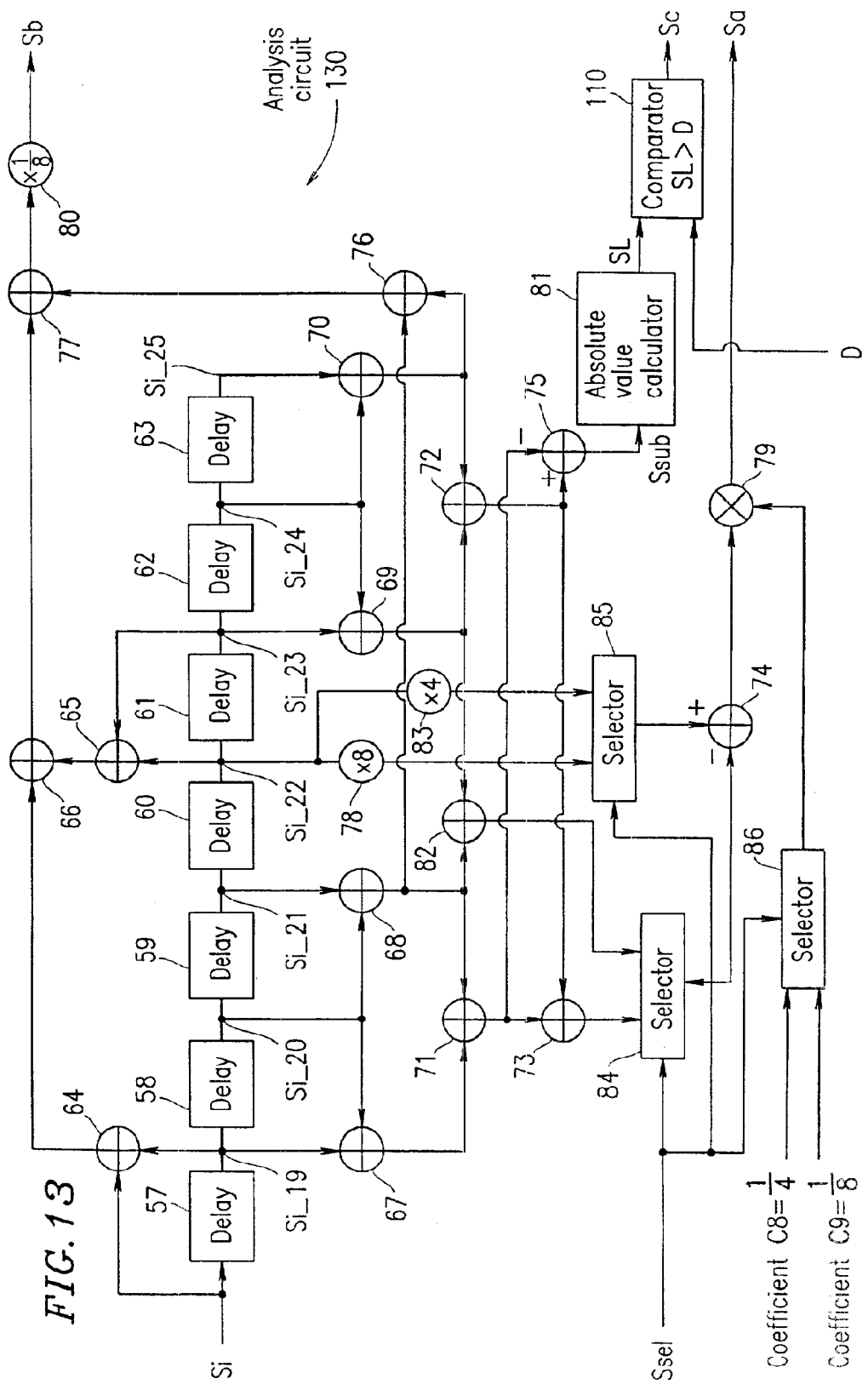
FIG. 13 is a schematic circuit diagram showing an exemplary structure of an analysis circuit according to the first variation of embodiment 1.

In the above-described embodiment, the outline component extraction circuit 1, the outline detection circuit 4, and the signal level detection circuit 2 of the analysis circuit 120 are provided as separate components. However, according to embodiment 1 of the present invention, these circuits may be structured such that delays of a video signal and operations performed on the video signal can be commonly shared among these circuits, whereby the entire circuitry size can be reduced. FIG. 13 is a schematic circuit diagram showing an exemplary structure of an analysis circuit 130 in which the outline component extraction circuit 1, the outline detection circuit 4, and the signal level detection circuit 2 are integrated such that the entire circuitry size is reduced. In this example, a secondary differentiation filter is used for extracting an outline component Sa, and a 7-tap primary differentiation filter is used for detecting an outline. The signal level of a target pixel is calculated as an average of eight neighboring pixels around the target pixel. The number of taps of the secondary differentiation filter is switched between 7 taps and 5 taps according to an input source (i.e., according to the type or frequency characteristic of an input video signal Si). The analysis circuit 130 includes: seven unit delay elements 57–63; fifteen adders 64–77 and 82; four multipliers 78–80 and 83; an absolute value calculator 81; three selectors 84–86; and a comparator 110.

In the analysis circuit 130, the unit delay elements 57–63 are connected in series in this order, and the leading unit delay element 57 receives an input video signal Si. In this arrangement, delayed video signals Si_19 to Si_25 are obtained by sequentially delaying the input video signal Si. Herein, a delayed video signal Si_k is a signal delayed with respect to the input video signal Si by (k−18) pixels (for k=19, 20, . . . , 25). Among these delayed video signals Si_19 to Si_25, the delayed video signals Si_19 to Si_21, which are obtained from the left side of a 7-tap filter formed by the unit delay elements 57–63, are added up by the adders 67, 68, and 71. The delayed video signals Si_23 to Si_25, which are obtained from the right side of the 7-tap filter, are added up by the adders 69, 70, and 72. Further, the delayed video signals Si_20 and Si_21, which are obtained from the left side of a 5-tap filter formed by the unit delay elements 58–62, are added up by the adder 68. The delayed video signals Si_23 and Si_24, which are obtained from the right side of the 5-tap filter, are added up by the adder 69. Furthermore, the results of addition in the adders 71 and 72 are added up by the adder 73, and the results of addition in the adders 68 and 69 are added up by the adder 82. The results of addition in the adders 73 and 82 and an input source determination signal Ssel are input to the selector 84. In the selector 84, one of the results from the adders 73 and 82 is selected according to the input source determination signal Ssel. In the selector 84 in this example, when the input video signal Si is a video signal based on a HDTV method, the result from the adder 82 is selected; and when the video signal Si is a video signal based on a NTSC method, the result from the adder 73 is selected. The delayed video signals Si_22, which resides at a temporal center among the delayed video signals Si_19 to Si_25, is input to the multipliers 78 and 83. The results of multiplication on the delayed video signals Si_22 in the multipliers 78 and 83 and the input source determination signal Ssel are input to the selector 85. In the selector 85, one of the results from the multipliers 78 and 83 is selected according to the input source determination signal Ssel. In the selector 85 in this example, when the input video signal Si is a video signal based on a HDTV method, the result from the multiplier 83 (4×Si_22) is selected; and when the video signal Si is a video signal based on a NTSC method, the result from the multiplier 78 (8×Si_22) is selected. The signal selected by the selector 85 and the signal selected by the selector 84 are input to the adder 74. In the adder 74, the signal output from the selector 84 is extracted from the signal output from the selector 85. Thus, the adder 74 outputs a signal which corresponds to a difference between the signal output from the selector 84 and the signal output from the selector 85. The selector 86 receives predetermined coefficients C8 and C9, and the input source determination signal Ssel. In this example, when the input video signal Si is a video signal based on a HDTV method, coefficient C8 (in this example, "¼") is input to the selector 86; and when the video signal Si is a video signal based on a NTSC method, coefficient C9 (in this example, "⅛") is input to the selector 86. The signal from the adder 74, which corresponds to a difference between the signal output from the selector 84 and the signal output from the selector 85, and the coefficient selected by the selector 86 are input to the multiplier 79. In the multiplier 79, the signal from the adder 74 is multiplied by the selected coefficient. The result of the multiplication is output from the multiplier 79 as an outline component Sa.

The results of addition in the adders 71 and 72 are input to the adder 75. The adder 75 outputs a difference signal Ssub which corresponds to the difference between the results of addition in the adders 71 and 72. The difference signal Ssub is input to the absolute value calculator 81. The absolute value calculator 81 generates an absolute value signal SL so as to have a signal value equal to the absolute value of a value of the difference signal Ssub. The absolute value signal SL and outline detection threshold value D output from the parameter calculation circuit 3 are input to the comparator 110. Based on the comparison between the absolute value signal SL and outline detection threshold value D, an outline detection signal Sc which indicates the presence/absence of an outline is output from the comparator 110. Specifically, the comparator 110 outputs the outline detection signal Sc, which is at a H level when the value of the absolute value signal SL is greater than outline detection threshold value D, and which is at a L level when the value of the absolute value signal SL is equal to or smaller than outline detection threshold value D.

The adder 64 adds up the input video signal Si and the delayed video signal Si_19, and the adder 65 adds up the delayed video signals Si_22 and Si_23. The adder 66 receives and adds up the results of addition in the adders 64 and 65. The adder 76 receives and adds up the results of addition in the adders 68 and 70. The adder 77 receives and adds up the results of addition in the adders 66 and 76. The result of addition performed in the adder 77 is multiplied by "⅛" by the multiplier 80. The result of multiplication in the multiplier 80 is a signal which indicates an average of eight neighboring pixels around a target pixel corresponding to the delayed video signal Si_22. The result of multiplication is output from the multiplier 80 as a level signal Sb which indicates the signal level Lb of the input video signal Si.

As described above, the effects of the present invention can be obtained even when the outline component extraction circuit 1, the outline detection circuit 4, and the signal level detection circuit 2 are integrated in the analysis circuit 130 such that the entire circuitry size is reduced, and the analysis circuit 130 is used in place of the analysis circuit 120.

<3. Second Variation of Embodiment 1>

Figure 14:
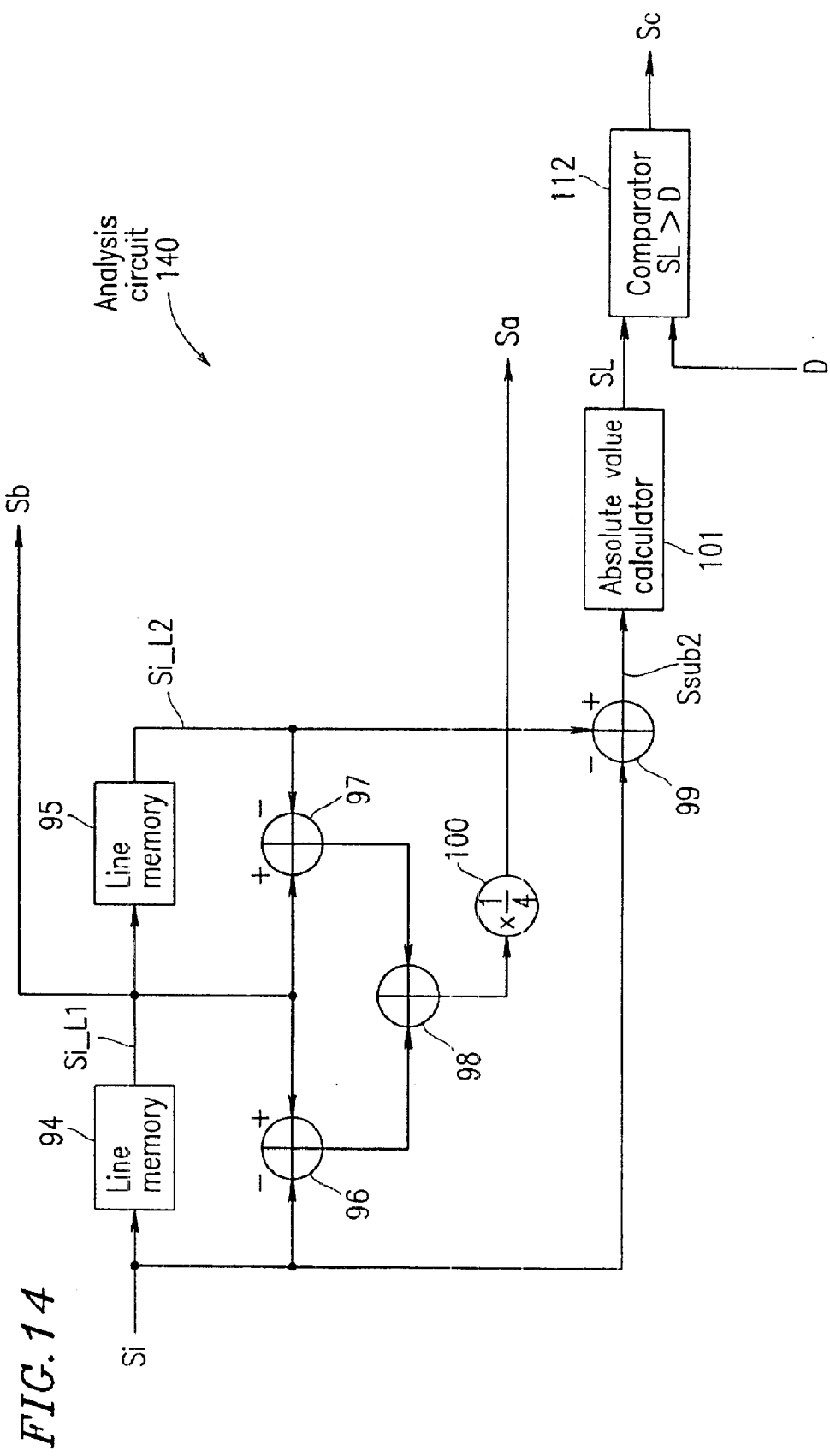
FIG. 14 is a schematic circuit diagram showing an exemplary structure of an analysis circuit according to the second variation of embodiment 1.

In the above embodiments, a portion of the input video signal Si in which a temporal variation rate (primary differentiation value) is equal to or greater than a predetermined value is regarded as being corresponding to an outline portion, and this portion is subjected to outline correction. That is, outline compensation is performed on a plurality of pixels which are horizontally adjacent to the image such that an outline extending in the vertical direction in an image expressed by the input video signal Si is emphasized. However, outline compensation may be performed on a plurality of pixels which are vertically adjacent to the image such that an outline extending in the horizontal direction in an image expressed by the input video signal Si is emphasized. Such outline compensation in the vertical direction can be achieved by replacing the unit delay elements in the above embodiments with line memories. FIG. 14 is a schematic circuit diagram showing an exemplary structure of an analysis circuit 140 used for outline compensation in the vertical direction. In this example, a 3-tap secondary differentiation filter is used for extracting an outline component Sa, and a 3-tap primary differentiation filter is used for generating an outline detection signal Sc. The signal level of the video signal represents a value of a target pixel. The analysis circuit 140 includes: two line memories 94 and 95; four adders 96–99; a multiplier 100; an absolute value calculator 101; and a comparator 112.

In the analysis circuit 140, the line memories 94 and 95 are connected in series, and the line memory 94 receives the input video signal Si. In this arrangement, a 1-line delayed video signal Si_L1 is obtained by delaying the input video signal Si by one line, and a 2-line delayed video signal Si_L2 is obtained by delaying the input video signal Si by two lines. The adder 96 receives the input video signal Si and the 1-line delayed video signal Si_L1. In the adder 96, the input video signal Si is subtracted from the 1-line delayed video signal Si_L1, and the result of subtraction is output from the adder 96 as a first difference signal. The adder 97 receives the 1-line delayed video signal Si_L1 and the 2-line delayed video signal Si_L2. In the adder 97, the 2-line delayed video signal Si_L2 is subtracted from the 1-line delayed video signal Si_L1, and the result of subtraction is output from the adder 97 as a second difference signal. The adder 98 receives the first and second difference signals. In the adder 98, the first and second difference signals are added up, and the result of addition is output from the adder 98. In the multiplier 100, the result of addition obtained from the adder 98 is multiplied by "¼", and the result of multiplication is output from the multiplier 100 as an outline component Sa.

The adder 99 receives the input video signal Si and the 2-line delayed video signal Si_L2. In the adder 99, the input video signal Si is subtracted from the 2-line delayed video signal Si_L2, and the result of subtraction is output from the adder 99 as a difference signal Ssub2. The difference signal Ssub2 is input to the absolute value calculator 101. The absolute value calculator 101 generates an absolute value signal SL so as to have a signal value equal to the absolute value of a value of the difference signal Ssub2. The comparator 112 receives the absolute value signal SL and outline detection threshold value D which is output from the parameter calculation circuit 3. Based on a comparison between the absolute value signal SL and outline detection threshold value D, an outline detection signal Sc which indicates the presence/absence of an outline is output from the comparator 112. Specifically, the comparator 112 outputs the outline detection signal Sc, which is at a H level when the value of the absolute value signal SL is greater than outline detection threshold value D, and which is at a L level when the value of the absolute value signal SL is equal to or smaller than outline detection threshold value D.

The 1-line delayed video signal Si_L1, which is output from the line memory 94, represents a target pixel. The 1-line delayed video signal Si_L1 is output as a level signal Sb which indicates the signal level Lb of a video signal that is to be subjected to outline compensation.

The analysis circuit 140 having the structure shown in FIG. 14, which is used for outline compensation in the vertical direction, is equivalent to the analysis circuit 130 shown in FIG. 13 which integrally includes the outline component extraction circuit 1, the outline detection circuit 4, and the signal level detection circuit 2. Even when the analysis circuit 140 is used in place of the analysis circuit 120 in the above-described embodiment, the effects of the present invention can be obtained in outline compensation in the vertical direction, while suppressing an increase in the circuitry size.

<4. Embodiment 2>

In embodiment 1, the present invention has been described in the form of an image emphasizing apparatus which performs outline compensation on an input video signal Si based on raster scanning, such as a video signal used in a television receiver, for example. However, outline compensation of embodiment 1 can be achieved by software processing using a computer. Even in such a case, the same effects as those of embodiment 1 can be obtained. Hereinafter, a program for executing an outline compensation process, which is substantially the same as that described in embodiment 1, by using a computer, on image data stored in a predetermined storage section (hereinafter, "image emphasizing program") is described as a second embodiment of the present invention.

Figure 15:
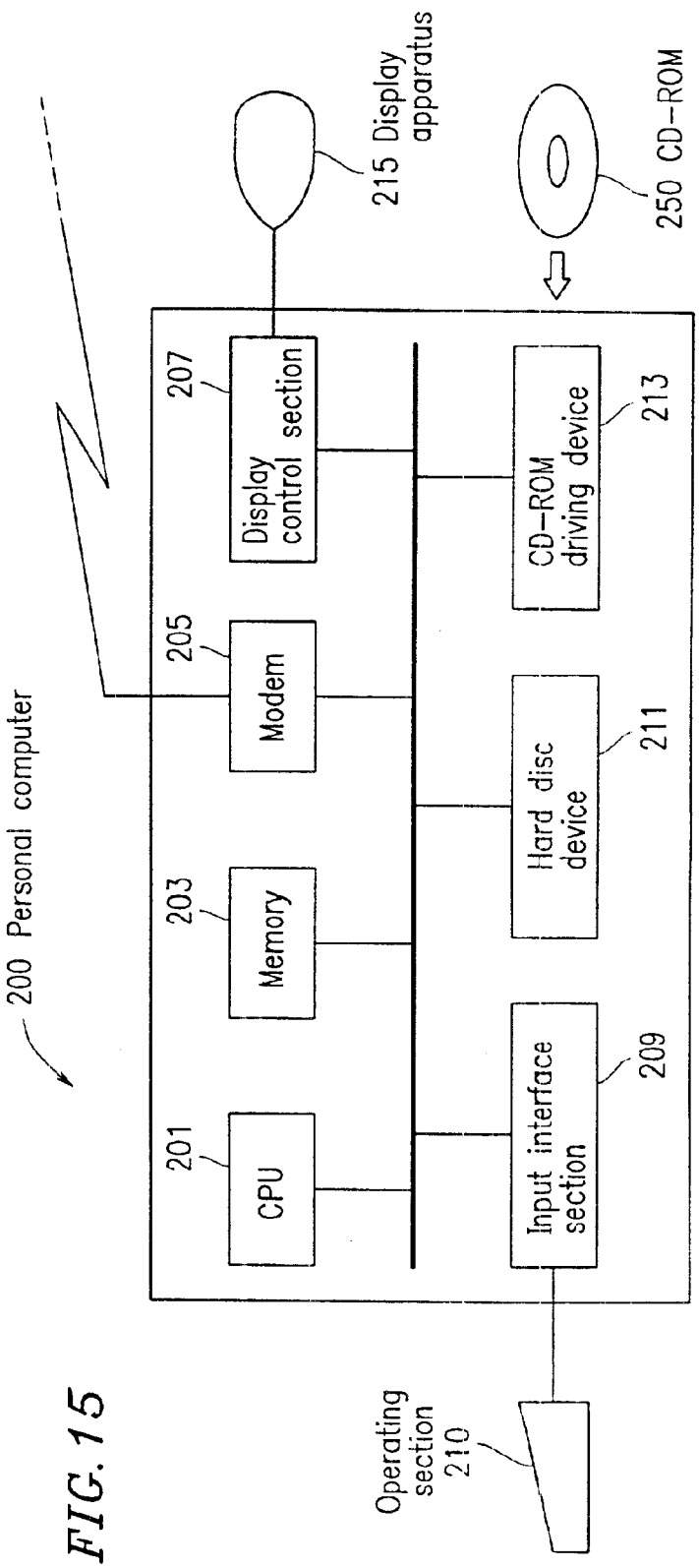
FIG. 15 is a block diagram showing a structure of a personal computer which executes an image emphasizing program according to embodiment 2 of the present invention.

FIG. 15 is a block diagram showing a structure of a personal computer 200 which executes an image emphasizing program according to embodiment 2 of the present invention. The personal computer 200 is a general purpose computer, which includes: a CPU (central processing unit) 201; a memory 203; a modem 205; a display control section 207; an input interface section 209; a hard disc device 211; and a CD-ROM driving device 213. These components are connected through a bus. To the input interface section 209, an operating section 210, such as a keyboard, a mouse, or the like, is connected. To the display control section 207, a display apparatus 215, such as a CRT display, a liquid crystal display, or the like, is connected. The image emphasization program according to embodiment 2 is typically supplied from a recording medium in which the program is contained, such as a CD-ROM or the like. A user buys a CD-ROM (recording medium) 250 that contains the image emphasizing program according to embodiment 2. The user inserts the CD-ROM 250 into the CD-ROM driving device 213 and installs the program from the CD-ROM 250 into the hard disc device 211. Alternatively, the personal computer 200 may receive the image emphasizing program transmitted through a communication line connected to the modem 205 so that the program is installed on the hard disc device 211. Alternatively, the image emphasizing program may be installed on the hard disc device 211 of the personal computer 200 before the manufacturer ships it out from their factory. The image emphasizing program installed on the hard disc device 211 is transferred to the memory 203 when it is started according to a predetermined instruction by the user through the operating section 210. The image emphasizing program is temporarily stored in the memory 203 and executed by the CPU 201. As a result, the personal computer 200 operates as an apparatus which performing an outline compensation process, as does the above described image emphasizing apparatus of embodiment 1. In embodiment 2, data which expresses an image to be subjected to outline compensation is stored in advance in the hard disc device 211 as original image data. When the image emphasizing program according to embodiment 2 is started, the CPU 201 performs an outline compensation process on the original image data based on the image emphasizing program. Image data obtained after the outline compensation process (hereinafter, "processed image data") is generated and stored in the hard disc device 211.

Figure 16:
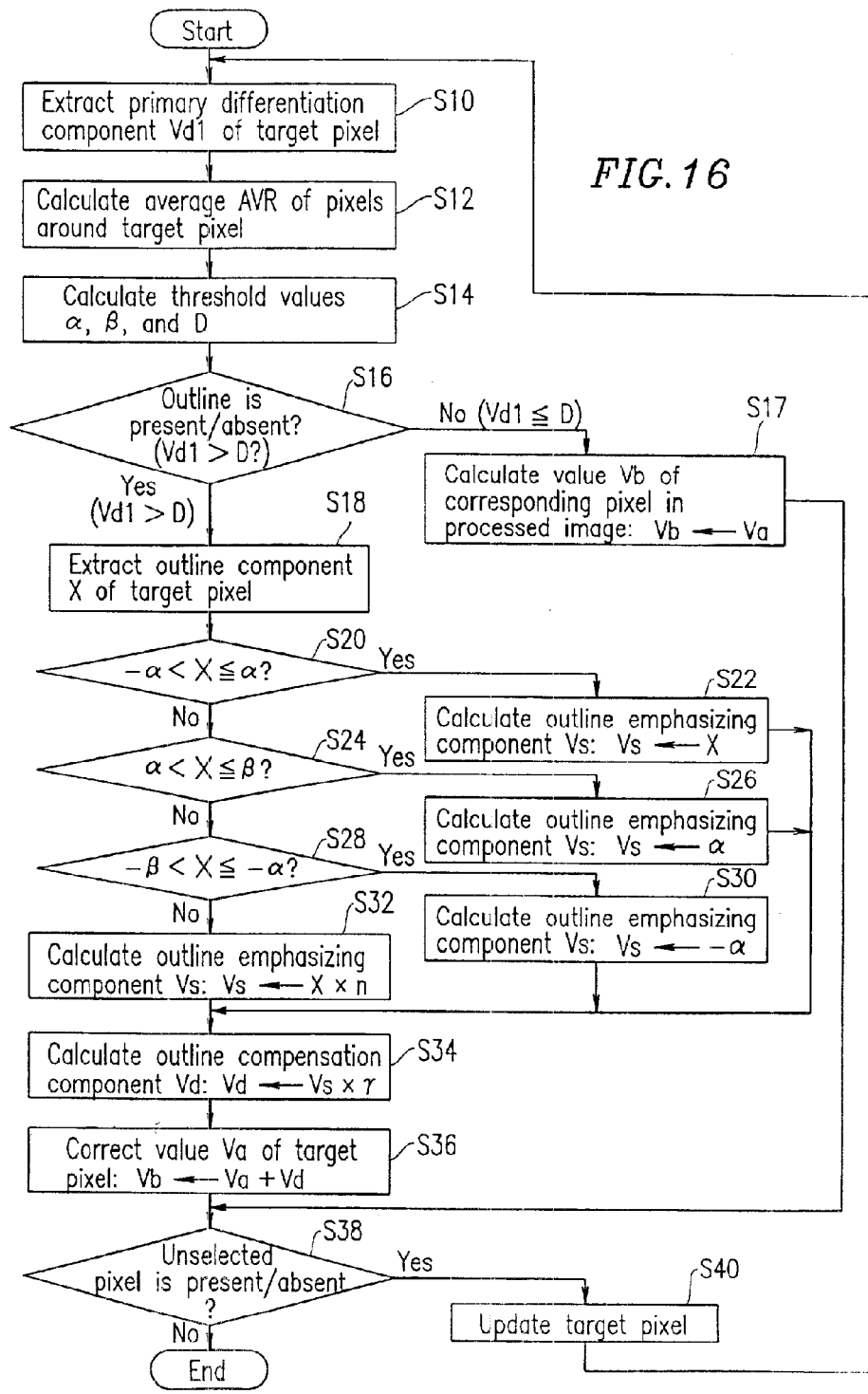
FIG. 16 is a flowchart for illustrating a procedure of an outline compensation process which is performed based on the image emphasizing program according to embodiment 2 of the present invention.
Figure 17:
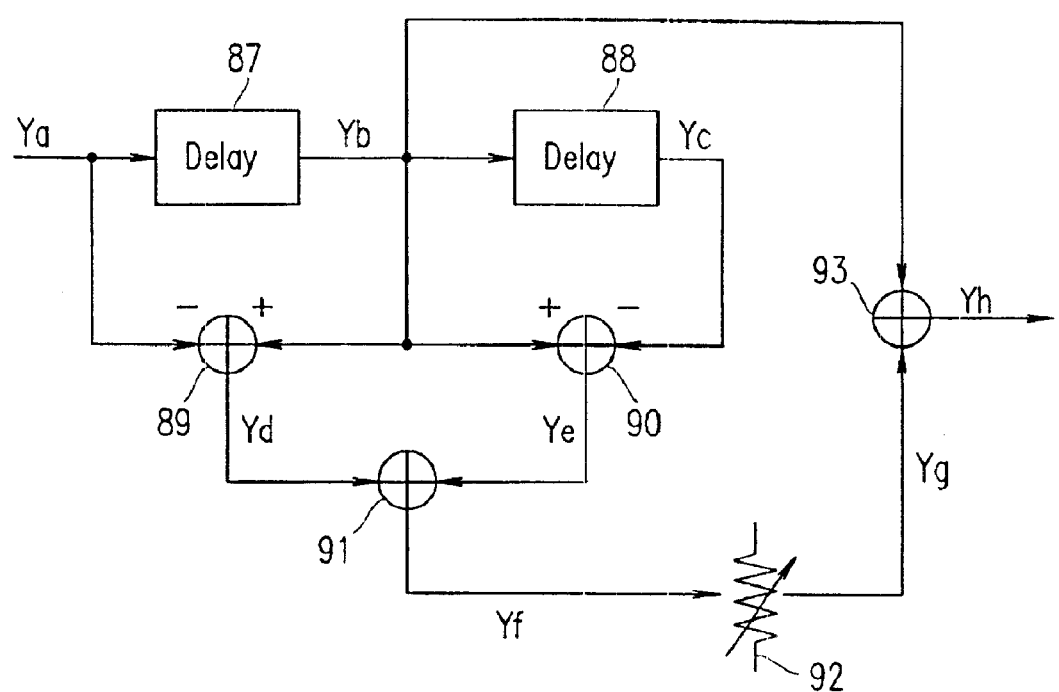
FIG. 17 is a schematic circuit diagram showing an exemplary structure of a conventional outline compensation circuit.
Figure 18:
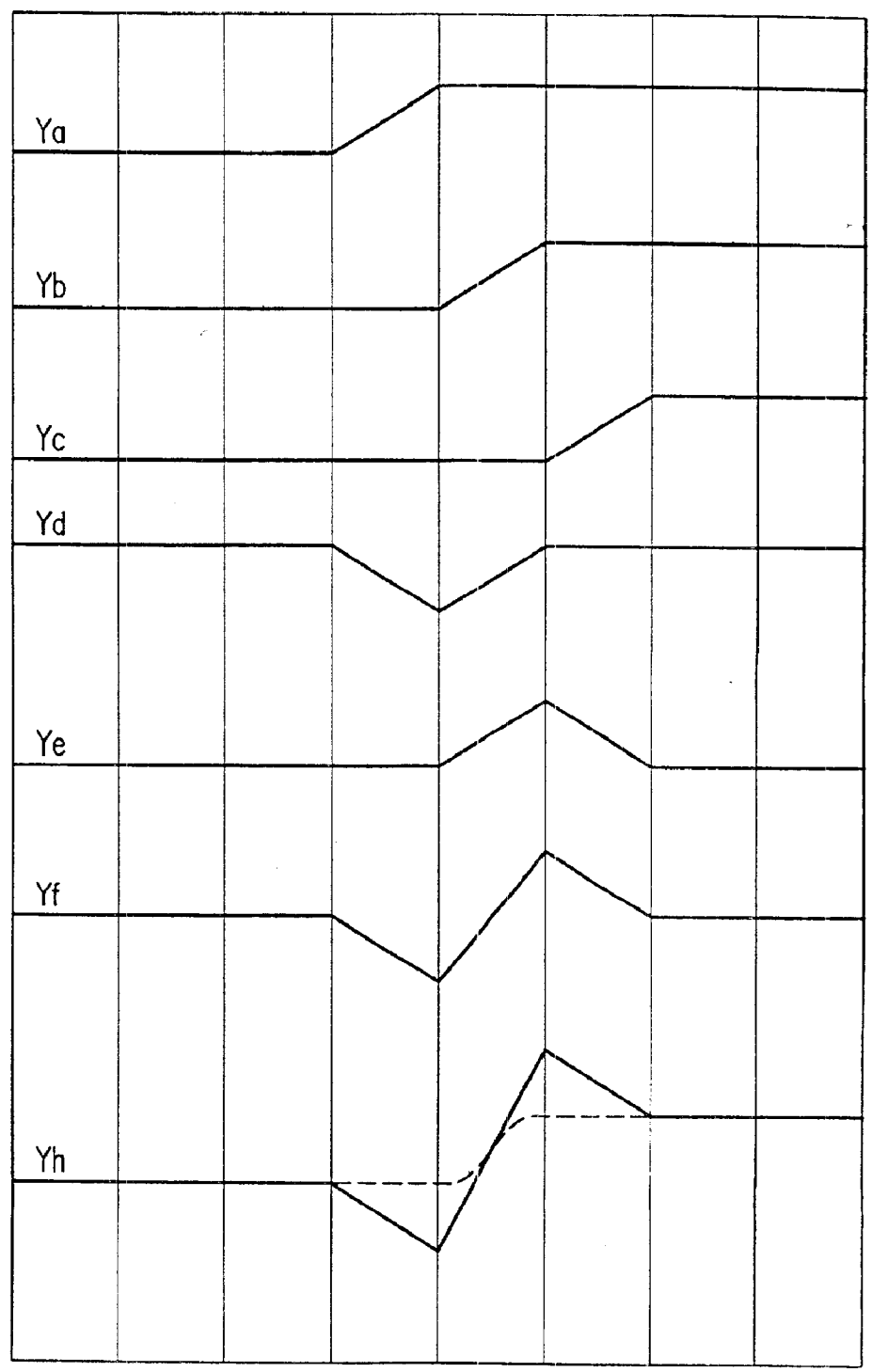
FIG. 18 is a signal waveform diagram illustrating an operation of the conventional outline compensation circuit.
Figure 19:
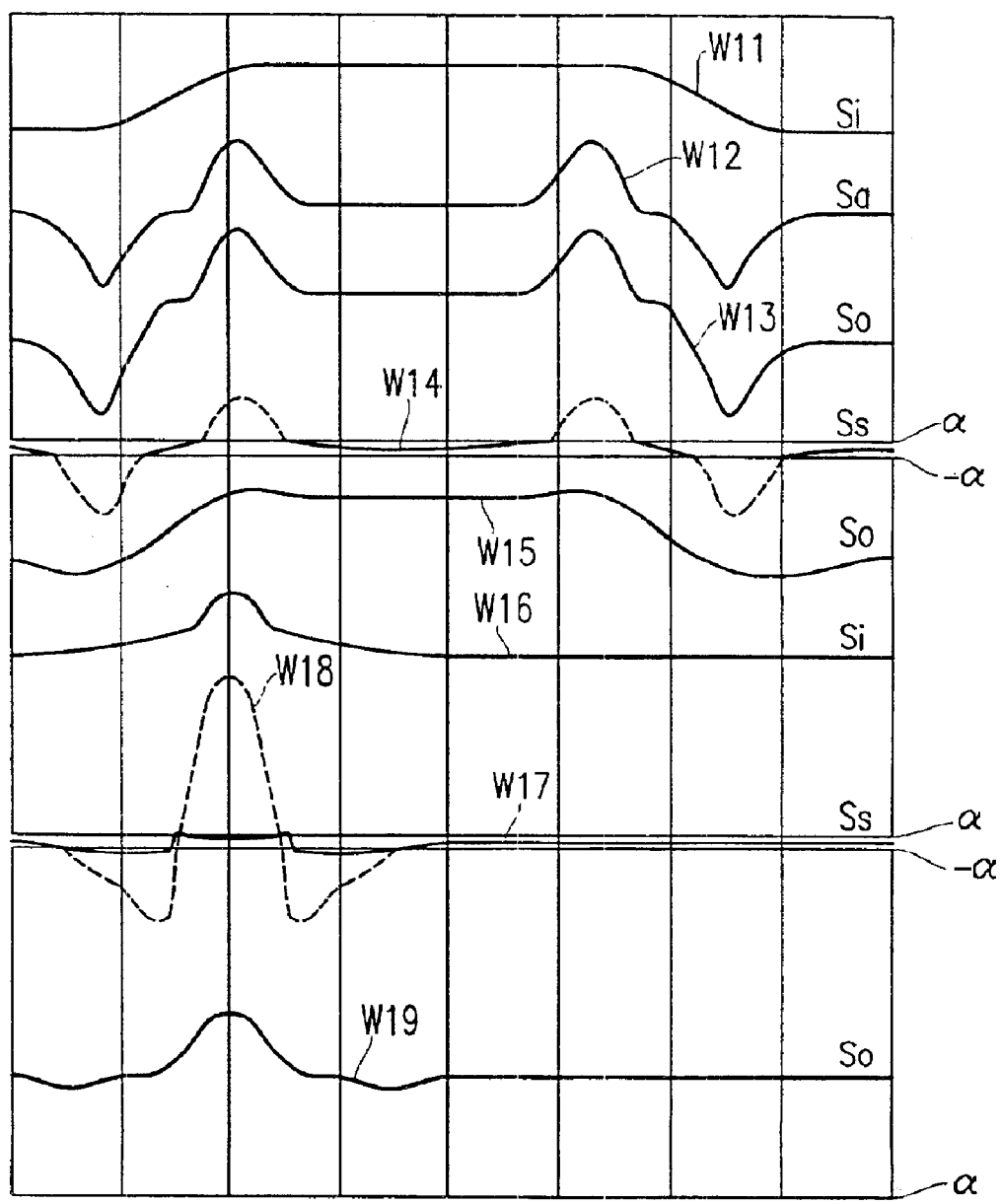
FIG. 19 is a signal waveform diagram illustrating an operation of the conventional outline compensation circuit.

FIG. 16 is a flowchart illustrating a procedure of an outline compensation process which is performed based on the image emphasizing program of embodiment 2. When the image emphasizing program is started, the CPU 201 operates as described below.

The CPU 201 sequentially selects pixels in an original image expressed by original image data on a pixel-by-pixel basis, and calculates a variation in the pixel value of the selected pixel (target pixel) in order to detect presence/absence of an outline at the target pixel in the original image (step S10). According to embodiment 2, primary differentiation component Vd1 is calculated as the variation in the pixel value of the target pixel. Next, the average of values of a plurality of pixels around the target pixel, average AVR, is calculated (step S12). For example, average AVR may be the average value of eight neighboring pixels around the target pixel. Next, as in embodiment 1, the excessive emphasis correction threshold value $\alpha$ for suppressing excessive emphasis of an outline (first threshold), the fine component emphasis threshold value $\beta$ for emphasizing an outline of a fine detailed image (second threshold), and the outline detection threshold D for outline detection (third threshold) are calculated so as to be conformable to average AVR (step S14). In this step, it is preferable that threshold values $\alpha$, $\beta$, and D are calculated based on externally-supplied parameters $\alpha i$, $\beta i$, and Di, respectively. For example, preferably, each of the externally-supplied parameters $\alpha i$, $\beta i$, and Di is multiplied by a predetermined value that is conformable to average AVR, so as to calculate threshold values $\alpha$, $\beta$, and D, respectively. In this example, $\alpha<\beta$.

Thereafter, the presence/absence of an outline at the target pixel is detected based on a comparison between the primary differentiation component Vd1 of the target pixel and the outline detection threshold D (step S16). If Vd1>D (Yes), it is determined that an outline is present at the target pixel in the original image. If Vd1$\leq$D (No), it is determined that an outline is absent at the target pixel in the original image.

When "No" at step S16, the value of the target value in the original image data, value Va, is used as it is as a value of a corresponding pixel in the processed image data, Vb (step S17). Then, the process proceeds to step S38.

When "Yes" at step S16, a high band component is extracted from the target pixel in the original image so as to obtain an outline component X (step S18). In embodiment 2, a secondary differentiation component at the target pixel in the original image is extracted as the outline component X. Thereafter, an outline emphasizing component Vs, which is used for determining an outline compensation component Vd that is to be added to a value of the target pixel for outline compensation, is obtained from the outline component X. If the absolute value of the outline component X of the target pixel, absolute value |X|, is smaller than the fine component emphasis threshold value $\beta$, the outline emphasizing component Vs is calculated from the outline component X, such that the absolute value of the outline emphasizing component Vs, absolute value |Vs|, is limited so as to be equal to or smaller than the excessive emphasis correction threshold value $\alpha$. Specifically, if the absolute value |X| of the outline component X at the target pixel is equal to or smaller than the excessive emphasis correction threshold value $\alpha$, the outline component X is used as the outline emphasizing component Vs. If the absolute value |X| of the outline component X at the target pixel is greater than the excessive emphasis correction threshold value $\alpha$, the absolute value |Vs| of the outline emphasizing component Vs is limited so as to be equal to or smaller than the excessive emphasis correction threshold value $\alpha$, in order to prevent undesirable display where an outline has a fringe as a result of outline compensation. If the absolute value |X| of the outline component X at the target pixel is greater than the fine component emphasis threshold value $\beta$, the outline component X is amplified and the amplified outline component X is used as the outline emphasizing component Vs, in order to perform sufficient outline emphasis on a fine detailed image included in the original image. Specifically, when $-\alpha<X\leq\alpha$ at step S20, the outline component X at the target pixel is used as the outline emphasizing component Vs (step S22). When $\alpha<X\leq\beta$ at step S24, the excessive emphasis correction threshold value $\alpha$ is used as the outline emphasizing component Vs (step S26). When $-\beta<X\leq-\alpha$ at step S28, an inverted value of the excessive emphasis correction threshold value $\alpha$, threshold value $-\alpha$, is used as the outline emphasizing component Vs (step S30). Otherwise, i.e., when $X>\beta$ or when $X\leq-\beta$, a value obtained by multiplying the outline component X by n, value X×n, is used as the outline emphasizing component Vs (step S32). Herein, "n" is any gain value; for example, it may be 2.

The thus-calculated outline emphasizing component Vs is multiplied by a predetermined coefficient γ, and the obtained value Vs×γ is used as the outline compensation component Vd (step S34). Herein, coefficient γ is a parameter used for gain adjustment; for example, it may be externally supplied.

Next, the outline compensation component Vd is added to value Va of the target pixel in the original image data, and the obtained value, Va+Vd, is used as value Vb of a corresponding pixel in the processed image data (step S36). Then, the process proceeds to step S38.

At step S38, it is determined whether or not an unselected pixel remains in the original image. If there are unselected pixels, any of the unselected pixels is selected as a next target pixel, i.e., the target pixel is updated (step S40). Then, the process returns to step S10. Thereafter, steps S10 to S40 are repeated until all the pixels are selected. After processing of steps S10 to S40 have been performed on the last pixel, the outline compensation process ends.

As described above, according to embodiment 2, a process based on an image emphasizing program (software) is performed for obtaining an image on which outline compensation that is substantially the same as that of embodiment 1 is performed. That is, even in embodiment 2, the same effects as those of embodiment 1 can be obtained.

<5. Other Variations>

The present invention is not limited to the above described embodiments or variations, but can be modified into various forms so long as they are within the scope of the present invention. For example, in the above embodiments, presence/absence of an outline at the target pixel is detected based on the outline detection threshold D, and outline emphasization (addition of the outline compensation signal Sd or outline compensation component Vd) is performed only when an outline is detected. However, addition of the outline compensation signal Sd to the input video signal Si, or addition of the outline compensation component Vd to value Va of the target pixel, may always be performed without performing such outline detection.

In the above embodiments, the excessive emphasis correction threshold value $\alpha$, the fine component emphasis threshold value $\beta$, and the outline detection threshold D are set to values which are conformable to the signal level Lb of a video signal, or to the average AVR of neighboring pixels around a target pixel (see FIG. 5 and FIG. 16). However, when the variation range of the input video signal Si or a pixel value is not large, the threshold value $\alpha$, the fine component emphasis threshold value $\beta$, and the outline detection threshold D may be set to fixed values regardless of the signal level Lb of the input video signal Si.

In the above embodiments, first parameter $\alpha i$ used for determining the excessive emphasis correction threshold value $\alpha$, second parameter $\beta i$ used for determining the fine component emphasis threshold value $\beta$, and third parameter Di used for determining the outline detection threshold D, are supplied externally. However, when the input video signal Si which is to be subjected to the outline compensation process or the type or property of an original image are predetermined, the parameters $\alpha i$, $\beta i$, and Di may be preset in the image emphasizing apparatus or the image emphasizing program. Further, in embodiment 1, coefficients C1–C7 of the secondary differentiation filter which realizes the outline component extraction circuit 1 are set according to an externally-supplied input source determination signal Ssel. However, when the type of the video signal Si is fixed, the coefficients C1–C7 may be set to fixed values.

According to the present invention, the level of outline emphasization is selectively controlled according to the first and second thresholds based on first and second threshold values. Thus, unnatural outline emphasis due to undershoot or overshoot can be avoided, while the quality of a fine detailed image, such as a thin line, a small spot, etc., can be sufficiently improved through an outline emphasization process.

According to the present invention, when the absolute value of an outline component of an input video signal is smaller than the first threshold value, the outline component is output as an outline emphasizing signal. When the absolute value of the outline component is greater than the first threshold value and smaller than the second threshold value, a signal whose absolute value is equal to the first threshold value is generated as an outline emphasizing signal. When the absolute value of the outline component is greater than the second threshold value, a signal having an amplified outline component is generated as an outline emphasizing signal. In this way, the level of outline emphasization is selectively controlled according to the largeness of the outline component. Thus, unnatural outline emphasis due to undershoot or overshoot can be avoided, while the quality of a fine detailed image, such as a thin line, a small spot, etc., can be sufficiently improved through an outline emphasization process.

According to the present invention, since the passing band of a high pass filter can be externally changed, an optimum outline emphasizing process can be performed according to the frequency characteristic of a source of an input video signal. For example, an outline component can be extracted according to the type of an input video signal, e.g., according to whether the input video signal is based on an NTSC method or an HDTV method.

According to the present invention, the first and second threshold values are changed according to the level of an input video signal. Thus, an effect of sharpening an image expressed by the input video signal can be obtained uniformly over a range from a halftone level to a high-brightness level. Therefore, a machine incorporating the image emphasizing apparatus of the present invention can achieve a satisfactory improvement in the quality of an image. Accordingly, an observer of a display finds that the quality of a displayed image is improved in respect to brilliance and resolution, without noticing any interruptions.

According to the present invention, since the first and second threshold values can be adjusted externally, each of the threshold values can be set to an optimum threshold value according to a device to which the image emphasizing apparatus is connected, such as a CRT display, a liquid crystal display, a plasma display, or the like.

According to the present invention, an outline compensation signal is added only to a signal portion of the input video signal which expresses an outline of an image. Thus, even when the input video signal includes noise, a malfunction of an outline compensation section, which may be caused due to the noise, can be prevented.

According to the present invention, first, second, and third parameters are changed according to the level of the input video signal. Further, an outline compensation signal is added only to a signal portion of the input video signal which corresponds to an outline of an image and is detected according to the third threshold value. Thus, a malfunction of an outline compensation section, which may be caused due to noise, can be prevented, while an effect of sharpening an image expressed by the input video signal can be obtained uniformly over a range from a halftone level to a high-brightness level.

According to the present invention, since the first, second, and third threshold values can be adjusted externally, each of the threshold values can be set to an optimum threshold value according to a device to which the image emphasizing apparatus is connected, such as a CRT display, a liquid crystal display, a plasma display, or the like.

According to the present invention, the average value of the input video signal within its every predetermined length of period is detected as a level of the input video signal. Thus, threshold values, which are calculated at a subsequent stage, are not unnecessarily varied due to the input video signal that varies with the passage of time. Further, influence of noise which may be superimposed on the input video signal can be reduced.

According to the present invention, an outline compensation signal can be adjusted by adjusting an externally-supplied coefficient. Thus, the level of the outline compensation signal can be set to an optimum level according to a device to which the image emphasizing apparatus is connected, such as a CRT display, a liquid crystal display, a plasma display, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image emphasizing apparatus for emphasizing an outline of an image expressed by an input video signal by adding an outline compensation signal to the input video signal so as to sharpen the image expressed by the input video signal, comprising:

an outline component extraction section for extracting from the input video signal an outline component which is a signal component corresponding to the outline of the image;

a threshold value calculation section for calculating a first threshold value, which is used for suppressing excessive emphasis of the outline, and a second threshold value, which is used for emphasizing an outline of a fine detailed image included in the image, the second threshold value being greater than the first threshold value; and an outline correction section for generating an outline emphasizing signal from the outline component based on the first and second threshold values, and adding the outline emphasizing signal or a gain adjusted outline emphasizing signal, as the outline compensation signal, to the input video signal, thereby generating an output video signal which expresses an image obtained by sharpening the image, wherein the outline correction section includes:

an emphasizing signal generation section for generating the outline emphasizing signal, the outline emphasizing signal being generated while limiting an absolute value of the outline component so as to be equal to or smaller than the first threshold value when the absolute value of the outline component is equal to or smaller than the second threshold value, and the outline emphasizing signal being generated without limiting the absolute value of the outline component when the absolute value of the outline component is greater than the second threshold value; and a signal addition section for adding the outline compensation signal generated based on the outline emphasizing signal to the input video signal.

2. An image emphasizing apparatus according to claim 1 wherein:

the emphasizing signal generation section outputs the outline component as the outline emphasizing signal when the absolute value of the outline component is smaller than the first threshold value;

the emphasizing signal generation section generates as the outline emphasizing signal a signal whose absolute value is equal to the first threshold value when the absolute value of the outline component is greater than the first threshold value and is smaller than the second threshold value; and the emphasizing signal generation section generates a signal by amplifying the outline component as the outline emphasizing signal when the absolute value of the outline component is greater than the second threshold.

3. An image emphasizing apparatus according to claim 1, wherein the outline component extraction section is formed by a high pass filter whose passing band can be controlled externally.

4. An image emphasizing apparatus according to claim 1, further comprising a signal level detection section for detecting a level of the input video signal, wherein the threshold calculation section calculates the first and second threshold values according to the level detected by the signal level detection section.

5. An image emphasizing apparatus according to claim 4, wherein:

the threshold value calculation section calculates the first threshold value as a value which depends on an externally-supplied first parameter; and the threshold value calculation section calculates the second threshold value as a value which depends on an externally-supplied second parameter.

6. An image emphasizing apparatus according to claim 4, wherein the signal level detection section detects as the level of the input video signal, an average value of the input video signal averaged over a predetermined period length of the signal level detection section.

7. An image emphasizing apparatus according to claim 1, further comprising an outline detection section for detecting an outline portion that is a signal portion of the input video signal which expresses an outline of the image, wherein the outline correction section generates the output video signal by adding the outline compensation signal only to the outline portion of the input video signal.

8. An image emphasizing apparatus according to claim 7, further comprising a signal level detection section for detecting a level of the input video signal, wherein:

the threshold calculation section calculates the first and second threshold values according to the level detected by the signal level detection section, and calculates a third threshold value which is used for detecting the outline portion according to the level detected by the signal level detection section; and the outline detection section compares a variation of the input video signal with the third threshold value, and detects a portion of the input video signal in which a variation of the input video signal is greater than the third threshold value as the outline portion.

9. An image emphasizing apparatus according to claim 8, wherein:

the threshold value calculation section calculates the first threshold value as a value which depends on an externally-supplied first parameter;

the threshold value calculation section calculates the second threshold value as a value which depends on an externally-supplied second parameter; and the threshold value calculation section calculates the third threshold value as a value which depends on an externally-supplied third parameter.

10. An image emphasizing apparatus according to claim 1, wherein the outline correction section further includes a multiplication section for multiplying the outline emphasizing signal by an externally-supplied coefficient so as to generate the outline compensation signal.

11. An image emphasizing program for emphasizing an outline of original image data by adding an outline compensation component to the original image data so as to sharpen an image expressed by the original image data, the image emphasizing program allowing a computer to perform steps of:

extracting from the original image data an outline component which is a component corresponding to an outline of the image;

calculating a first threshold value which is used for suppressing excessive emphasis of the outline and a second threshold value which is used for emphasizing an outline of a fine detailed image included in the image, the second threshold value being greater than the first threshold value;

generating the outline emphasizing component from the outline component based on the first and second threshold values; and adding the outline emphasizing component or a gain adjusted component of the outline emphasizing component, as the outline compensation component, to the original image data, wherein at the step of generating the outline emphasizing component, the outline emphasizing component is generated while limiting an absolute value of the outline component so as to be equal to or smaller than the first threshold value when the absolute value of the outline component is equal to or smaller than the second threshold value, and the outline emphasizing component is generated without limiting the absolute value of the outline component when the absolute value of the outline component is greater than the second threshold value.

12. An image emphasizing program according to claim 11, which further allows the computer to perform a step of sequentially selecting pixels, which form an image expressed by the original image data, as a target pixel, and calculating a value of the target pixel or an average value of a plurality of pixels around the target pixel as an image level, wherein at the step of extracting the outline component, a component which corresponds to an outline at a position of the target pixel is extracted as the outline component; and at the step of calculating the thresholds, the first and second threshold values are calculated as values that are conformable to the image level.

13. An image emphasizing program according to claim 11, which further allows the computer to perform a step of sequentially selecting pixels, which form an image expressed by the original image data, as a target pixel, and determining whether or not an outline exists at a position of the target pixel, wherein at the step of extracting the outline component, a component which corresponds to an outline at a position of the target pixel is extracted as the outline component; and at the step of adding the outline compensation component, the outline compensation component is added only to a pixel of an image expressed by the original image data in which it is determined that an outline exists.

* * * * *